United States Patent [19]

Tanaka et al.

[11] Patent Number: 5,105,423
[45] Date of Patent: Apr. 14, 1992

[54] DIGITAL TRANSMISSION DEVICE HAVING AN ERROR CORRECTION MODE AND METHOD FOR SHIFTING DOWN A DATA TRANSMISSION RATE

[75] Inventors: Shigetaka Tanaka, Atsugi; Yuichi Saito, Hadano, both of Japan

[73] Assignee: Ricoh Company, Ltd., Tokyo, Japan

[21] Appl. No.: 352,460

[22] Filed: May 16, 1989

[30] Foreign Application Priority Data

May 17, 1988 [JP] Japan .................................. 63-118242
Aug. 20, 1988 [JP] Japan .................................. 63-205707
Jan. 18, 1989 [JP] Japan ........................................ 1-7732

[51] Int. Cl.$^5$ ........................... H04L 1/18; H04L 7/04
[52] U.S. Cl. ..................... 371/5.5; 358/412; 358/439; 371/32
[58] Field of Search ................. 371/5.5, 32; 358/405, 358/406, 435, 439, 412

[56] References Cited

U.S. PATENT DOCUMENTS

| | | | |
|---|---|---|---|
| 4,153,916 | 5/1979 | Miwa et al. | 358/439 X |
| 4,589,111 | 5/1986 | Adachi | 371/32 |
| 4,606,044 | 8/1986 | Kudo | 371/5.5 X |

FOREIGN PATENT DOCUMENTS

| | | | |
|---|---|---|---|
| 117865 | 7/1984 | Japan | 358/412 |
| 226561 | 12/1984 | Japan | 358/439 |
| 60-25375 | 2/1985 | Japan . | |
| 60-251760 | 12/1985 | Japan . | |

OTHER PUBLICATIONS

Woodruff, K. et al., "Automatic and Adaptive System for Efficient Communication . . . ", *IBM Tech. Disc. Bull.*, vol. 24, No. 9, Feb. 1982, pp. 4627-4629.

Primary Examiner—Stephen M. Baker
Attorney, Agent, or Firm—Oblon, Spivak, McClelland, Maier & Neustadt

[57] ABSTRACT

In a method for shifting down a data transmission rate at a transmitter in response to a request from a receiver for retransmission of data frames having data errors in a digital transmission system such as a facsimile system, when transmission errors occur, the receiver transmits a request to the transmitter for retransmission of one or more data frames for which one or more data errors have occurred. At the transmitter, the data transmission rate is shifted down from the first data transmission rate to a second data transmission rate which is used for retransmitting the data frames for which one or more data errors have occurred. The above shift-down operation is controlled by calculating an expected value indicating a possibility of the occurrence of a data error at the time of retransmitting the data frames in which one or more data errors have occurred, on the basis of a number of data frames requested to be retransmitted and a total number of data frames which have been transmitted from the transmitter to the receiver.

46 Claims, 14 Drawing Sheets

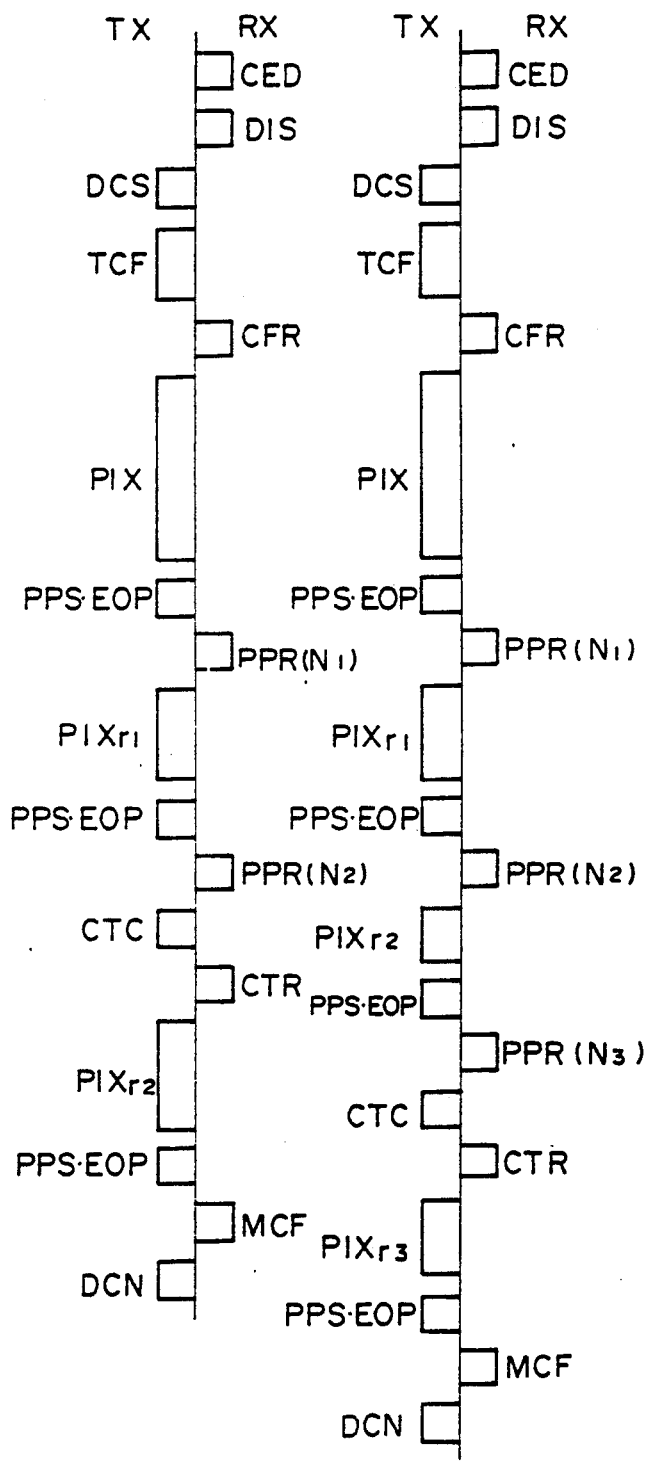

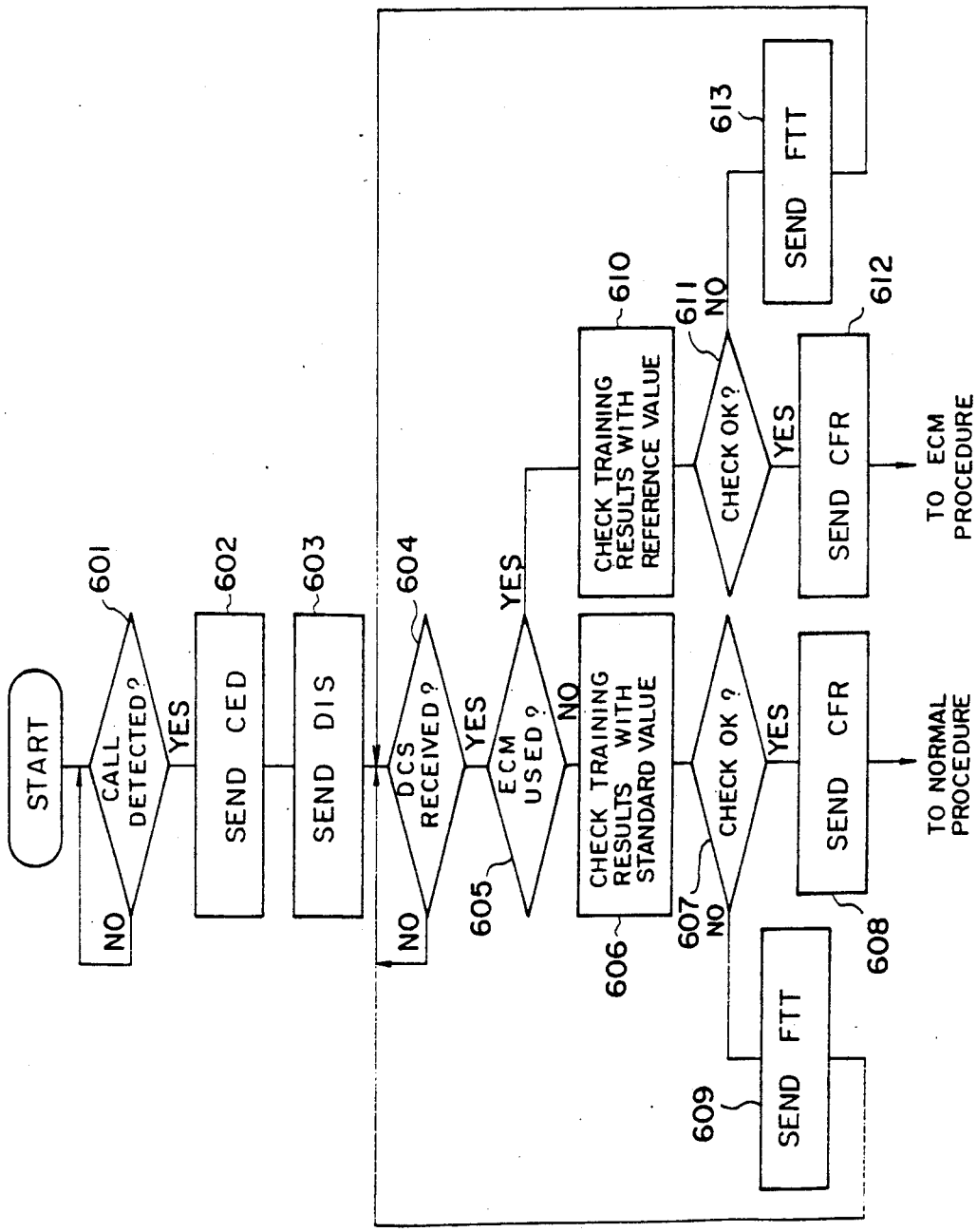

DIGITAL TRANSMISSION DEVICE HAVING AN ERROR CORRECTION MODE AND METHOD FOR SHIFTING DOWN A DATA TRANSMISSION RATE

BACKGROUND OF THE INVENTION

1. Field of the Invention

The present invention generally relates to a digital transmission system, and more particularly, to a digital transmission device such as a facsimile machine having an error correction mode and a method for shifting down a data transmission rate at a transmitter in response to a request from a receiver for retransmission of data frames having data errors in a digital transmission system system.

2. Discussion of the Background

In a facsimile transmission system, a receiver will not receive correct image information when a transmission error (also referred to as a data error) occurs due to the poor condition of the transmission line such as a wire line or a radio line being used. Presently, in order to cope with the occurrence of transmission errors, facsimile machines have error correction functions (modes), which are different for different manufacturers. Such facsimile machines can achieve image information transmission without error.

However, in many cases, there is no interchangeability among the error correction modes of different manufacturers. That is, a facsimile machine having one type of error correction mode cannot communicate with another facsimile machine having a different type error correction mode, when a transmission error occurs.

From the above-mentioned viewpoint, a standard procedure relating to error correction modes in facsimile transmission has been proposed by Comité Consultatif International Télégraphique et Téléphonique (hereafter simply referred to CCITT). The proposed standard procedure is issued as Annex A of the recommendation T.30 which defines functions of a group III facsimile machine. According to the recommendation T.30, image information after coding and compressing image data is divided into sub-frames each having 256 bytes (1 byte amounts to 8 bits) or 64 bytes. Then, as shown in FIG. 1A, image information amounting to one frame is arranged into a frame FLM defined by a high-level data link control (HDLC) frame format. Each frame FLM consists of a (beginning) flag sequence F consisting of a predetermined bit pattern, an address field A consisting of a predetermined bit pattern (global address), a control field C consisting of a bit pattern inherent in the type of facsimile machines, an information field I, a frame check sequence FCS, and a (end) flag F. These contents of the HDLC frame formats are arranged in the above-mentioned order from the beginning of the frame FLM.

The information field I consists of a facsimile control field FCF in which a facsimile transmission procedure signal is defined, and a facsimile information field FIF in which there is defined a variety of information to be added to the facsimile transmission procedure signal. In the facsimile control field FCF, there is disposed a facsimile coded data FCD of the facsimile transmission procedure signal. In the facsimile information field FIF, there are arranged a frame number FNo which represents the sequence of frames, and coded frame data FDc of one frame size FSZ. Since the frame number FNo consists of binary digits consisting of 8 bits, the frame number FNo is capable of representing consecutive numbers of only 0–255. For this reason, one block is defined with 256 consecutive frames, and a request for retransmission is generated for every block. In a case where image information amounting to one page cannot be transmitted with one block, the remaining data is transmitted so as to be set in the next block and transmitted.

When a request for retransmission is generated at a receiver, the receiver sends the transmitter a data frame having a facsimile transmission procedure signal PPR (a partial page request signal) as shown in FIG. 1 In the following description, the data frame having a facsimile transmission procedure signal PPR is simply referred to as a procedure signal PPR. A variety of data frames having related facsimile transmission procedure signals is actually used. For convenience' sake, these data frames are simply referred to as procedure signals.

The procedure signal PPR includes a bit pattern which indicates that the present signal is the procedure signal PPR and which is arranged in the facsimile control field FCF, and error map data EMp consisting of 256 bits which are arranged in the facsimile information field FIF. Each of the error map data EMp indicates the presence/non-presence of a transmission error for the respective frame data amounting to one block. Each error map data EMp has data '0' given a frame in which there occurs no transmission error, and data '1' given a frame in which a retransmission error occurs. The error map data EMp are arranged in the order of frames. When receiving the procedure signal PPR, the transmitter retransmits frame data relating to the frames to which the error map data EMp are set equal to "1". The request for retransmission is repetitively generated until all the frames have no transmission error. Thereby, the receiver can obtain the correct image information sent from the transmitter.

When the retransmission request for the same block is repetitively generated many times, it takes longer to transmit data. Therefore, when the retransmission request is repetitively generated a predetermined number of times, the transmission rate is shifted down by one step. The above is proposed by the aforementioned CCITT recommendation. This is described below with reference to FIG. 2.

When phase C indicating the transmission of image information is activated, image information equal to one block is transmitted (step 101). Subsequently, a signal PPS-Q (Q denotes is MPS, EOM, EOP, PRI-Q) that instructs a related operation to be executed after transmitting image information is sent to the receiver (step 102). Thereafter, the transmitter receives a response from the receiver.

The transmitter determines whether or not the transmission procedure signal indicated by the received response is the procedure signal PPR (step 104). When the result in step 104 is YES, the transmitter determines whether or not the received procedure signal PPR has been received for the M-th time. (step 105). When the result in step 105 is NO, the transmitter forms retransmission image information consisting of frames each having a transmission error (error frames) informed by the procedure signal PPR (step 106). Then the procedure returns to step 101.

On the other hand, the result in step 105 is YES when the number of times that the retransmission of the same block is requested, reaches a predetermined number.

Thus, the transmitter sends the receiver a continue-to-correct signal CTC used for informing the receiver that the transmission rate is shifted down by one step (step 107). Then the transmitter waits for a response for continue to correct CTR, which is sent back from the receiver when it is ready for receiving image information (step 108).

When receiving the procedure signal CTR the transmitter shifts down, by one step, the transmission rate at which image information is to be sent, and forms retransmission image information in step 106. Then the procedure returns to step 101, and the retransmission image information is sent to the receiver at the shifted-down transmission rate. On the other hand, when the result in step 104 is NO, the procedure is shifted to the process related to the contents of the procedure signal which was received in step 103. Then phase C ends.

In this manner, when the number of times that the retransmission of the same block is requested, reaches (m−1) times, the transmission rate to be set in the next transmission is shifted down by one step.

However, in the conventional retransmission procedure, the number of times that the same block is retransmitted, is always monitored irrespective of circumstances where transmission errors occur. For this reason, it takes extremely long to execute the retransmission procedure when transmission errors occur frequently due to deteriorated conditions on transmission lines, and transmission errors are not eliminated after the predetermined number of retransmission processes is repetitively carried out.

In order to eliminate the above-mentioned disadvantages, an improvement in retransmission in facsimile systems has been proposed in U.S. Pat. application Ser. No. 07/253,621 (the assignee of which is the same as that of the present application), the disclosure of which is hereby incorporated by reference. In the proposal, the transmission rate used for retransmitting image information is shifted down on the basis of the error ratio of the number of error frames informed by a receiver to the number of frames sent to the receiver. However, the shift-down process based on the error ratio, cannot effectively cope with a variety of circumstances where transmission errors occur. Therefore, there is plenty of room for improvement.

SUMMARY OF THE INVENTION

It is therefore a general object of the present invention to provide an improved digital transmission device having a retransmission function and an improved method for retransmitting image information.

A more specific object of the present invention is to provide an improved digital transmission device and an improved method for retransmitting image information capable of reducing the time it takes to retransmit image information in an error correction mode.

The above objects of the present invention can be achieved by a method for shifting down a data transmission rate at a transmitter in response to a request from a receiver for retransmission of data frames having data errors in a digital transmission system, comprising the steps of transmitting a plurality of data frames of image information from the transmitter to the receiver through a line at a first data transmission rate; determining at the receiver as to whether or not each of the data frames contains one or more data errors; transmitting a request from the receiver to the transmitter for retransmission of one or more data frames for which one or more data errors have occurred; shifting down the data transmission rate from the first data transmission rate to a second data transmission rate which is used for retransmitting the one or more data frames for which one or more data errors have occurred; and calculating an expected value indicating the possibility of the occurrence of a data error at the time of retransmitting the one or more data frames for which one or more data errors have occurred, on the basis of a number of data frames requested to be retransmitted and a total number of data frames which have been transmitted from the transmitter to the receiver, the second data transmission rate being determined based on the calculated expected value.

The above-mentioned objects of the present invention can also be achieved by a method for shifting down a data transmission rate at a transmitter in response to a request from a receiver for retransmission of data frames having data errors in a digital transmission system, comprising the steps of transmitting a plurality of data frames of image information from the transmitter to the receiver at a first data transmission rate; determining at the receiver as to whether or not each of the data frames contains one or more data errors; transmitting a request from the receiver to the transmitter for retransmission of one or more data frames for which one or more data errors have occurred; shifting down the data transmission rate from the first data transmission rate to a second data transmission rate, calculating a first data transmission time based on the first data transmission rate and a total number of data frames transmitted from the beginning of transmitting the plurality of data frames of image information from the transmitter, and a second data transmission time based on the second data transmission rate and a number of data frames transmitted in the first data transmission; comparing the first and second data transmission times and generating a comparison result; and transmitting, at the second data transmission rate, the one or more data frames to be retransmitted when the comparison result indicates that the first data transmission time is equal to or larger than the second data transmission time, and transmitting, at the first data transmission rate, the one or more data frames to be retransmitted when the comparison result indicates that the first data transmission time is smaller than the second data transmission time.

The aforementioned objects of the present invention can also be achieved by a method for shifting down a data transmission rate at a transmitter in response to a request from a receiver for retransmission of data frames having data errors in a digital transmission system, comprising the steps of transmitting a plurality of data frames of image information from the transmitter to the receiver at a first data transmission rate; determining at the receiver as to whether or not each of the data frames contains one or more data errors; transmitting a request from the receiver to the transmitter for retransmission of one or more data frames for which one or more data errors have occurred; shifting down the data transmission rate from the first data transmission rate to a second data transmission rate, calculating a first data transmission time based on the first data transmission rate and a total number of data frames to be retransmitted, and a second data transmission time time based on the second data transmission rate and a number of data frames transmitted in the first retransmission; comparing the first and second data transmission times and generating a comparison result; and transmitting, at the second data transmission rate, the one or more data frames to be retransmitted when the comparison result indicates that the first data transmission time is equal to or larger than the second data transmission time, and transmitting, at the first data transmission rate, the one or more data frames to be retransmitted when the comparison result indicates that the first data transmission time is smaller than the second data transmission time.

The aforementioned object of the present invention can also be achieved by a digital transmission device comprising reading means for reading a document image to be transmitted and outputting corresponding image information; processing means, connected to the reading means, for processing the image information supplied from the reading means to produce a plurality of data frames from the image information; transmitting means, connected to the processing means, for transmitting the plurality of data frames supplied from the processing means to a receiver at a remote location through a transmission line; receiving means for receiving data frames from the receiver and generating an original document image from the received data frames; recording means, connected to the receiving means, for recording the original document supplied from the receiving means; and control means for controlling a data transmission rate set in the transmitting means such that the data transmission rate is shifted down from a first transmission rate to a second transmission rate when retransmitting one or more of the plurality of data frames. The control means automatically determines the second data transmission rate by calculating an expected value indicating the occurrence of a data error at the time of retransmitting the one or more data frames for which one or more data errors have occurred, on the basis of a number of data frames requested to be retransmitted and a total number of data frames which have been transmitted from the transmitter to the receiver.

The aforementioned objects of the present invention can also be achieved by a digital transmission device comprising reading means for reading a document image to be transmitted and outputting corresponding image information; processing means, connected to the reading means, for processing the image information supplied from the reading means to produce a plurality of data frames from the image information; transmitting means, connected to the processing means, for transmitting the plurality of data frames supplied from the processing means to a receiver at a remote location through a transmission line; receiving means for receiving data frames from the receiver and generating an original document image from the received data frames; recording means, connected to the receiving means, for recording the original document supplied from the receiving means; and control means for controlling a data transmission rate set in the transmitting means such that the data transmission rate is shifted down from a first transmission rate to a second transmission rate when retransmitting one or more of the plurality of data frames. The the control means comprises first means for calculating a first data transmission time based on the first data transmission rate and a total number of data frames transmitted from the beginning of transmitting the plurality of data frames of image information from the transmitter, and a second data transmission time based on the second data transmission rate and an number of data frames transmitted in the first data transmission; and second means for comparing the first and second data transmission times and generating a comparison result. The control means controls the transmitting means so as to transmit, at the second data transmission rate, the one or more data frames to be retransmitted when the comparison result indicates that the first data transmission time is equal to or larger than the second data transmission time, and to transmit, at the first data transmission rate, the one or more data frames to be retransmitted when the comparison result indicates that the first data transmission time is smaller than the second data transmission time.

The aforementioned objects of the present invention can also be achieved by a digital transmission device comprising reading means for reading a document image to be transmitted and outputting image information; processing means, connected to the reading means, for processing the image information supplied from the reading means to produce a plurality of data frames from the image information; transmitting means, connected to the processing means, for transmitting the plurality of data frames supplied from the processing means to a receiver at a remote location through a transmission line; receiving means for receiving data frames from the receiver and generating an original document image from the received data frames; recording means, connected to the receiving means, for recording the original document supplied from the receiving means; and control means for controlling a data transmission rate of the transmitting means such that the data transmission rate is shifted down from a first transmission rate to a second transmission rate when retransmitting one or more of the plurality of data frames. The control means comprises first means for calculating a first data transmission time based on the first data transmission rate and a total number of data frames to be retransmitted, and a second data transmission time time based on the second data transmission rate and a number of data frames transmitted in the first retransmission; and second means for comparing the first and second data transmission times and generating a comparison result. The control means controls the transmitting means so as to transmit, at the second data transmission rate, the one or more data frames to be retransmitted when the comparison result indicates that the first data transmission time is equal to or larger than the second data transmission time, and to transmit, at the first data transmission rate, the one or more data frames to be retransmitted when the comparison result indicates that the first data transmission time is smaller than the second data transmission time.

BRIEF DESCRIPTION OF THE DRAWINGS

Various other objects, features and attendant advantage of the present invention will be more fully appreciated as the same becomes better understood from the following detailed description when considered in connection with the accompanying drawings in which like reference characters designate like or corresponding parts throughout the several views and wherein:

FIG. 9A is a timing chart illustrating another procedure executed in the second embodiment;

FIG. 9B is a timing chart illustrating yet another procedure executed in the second embodiment;

FIG. 11 is a flowchart illustrating a receiving process executed in the second embodiment.

DESCRIPTION OF THE PREFERRED EMBODIMENTS

A description is given of a first preferred embodiment of the present invention with reference to FIGS. 3 through 6.

Figures 1A, 1B:
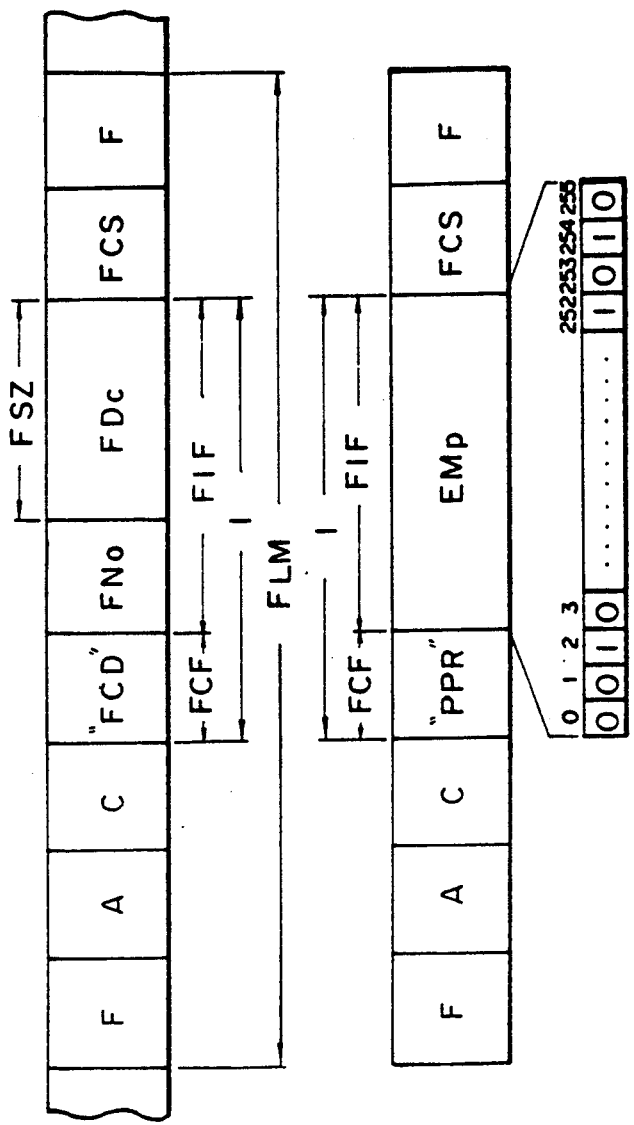
FIG. 1A is a schematic view illustrating an example of an image information frame.
FIG. 1B is a schematic view illustrating an example of a procedure signal PPR (partial page request signal)
Figure 2:
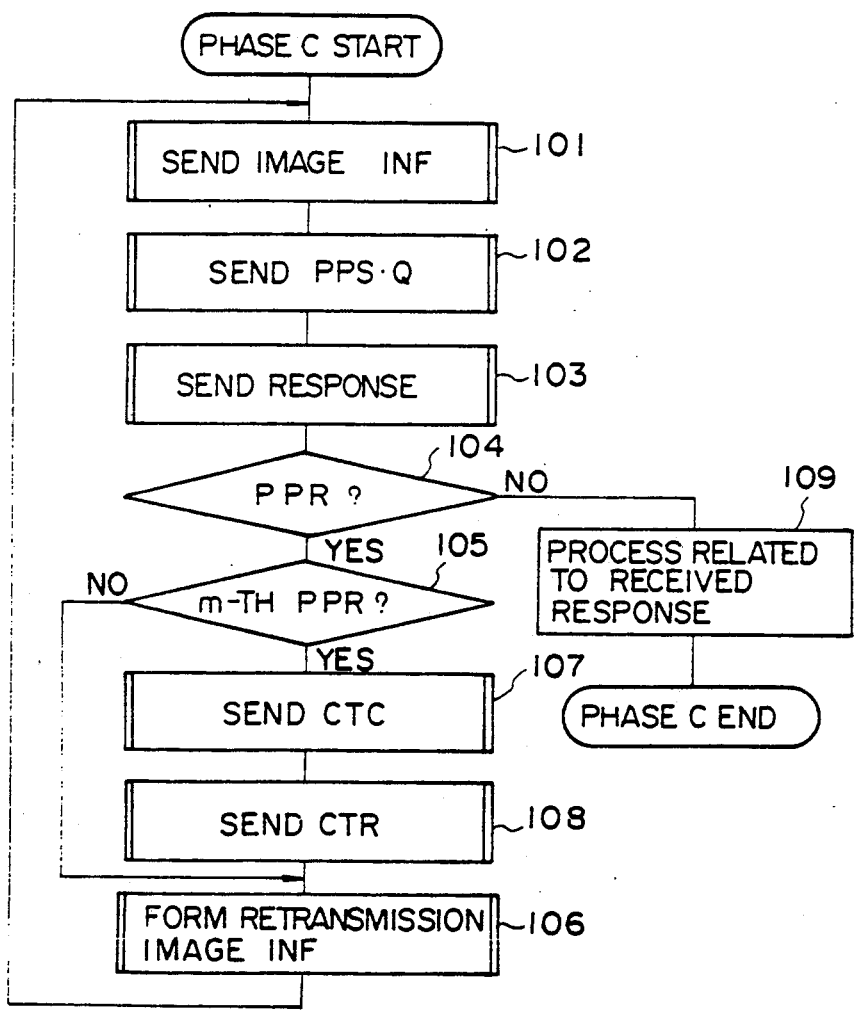
FIG. 2 is a flowchart of a transmission process in a conventional error correction mode.
Figure 3:
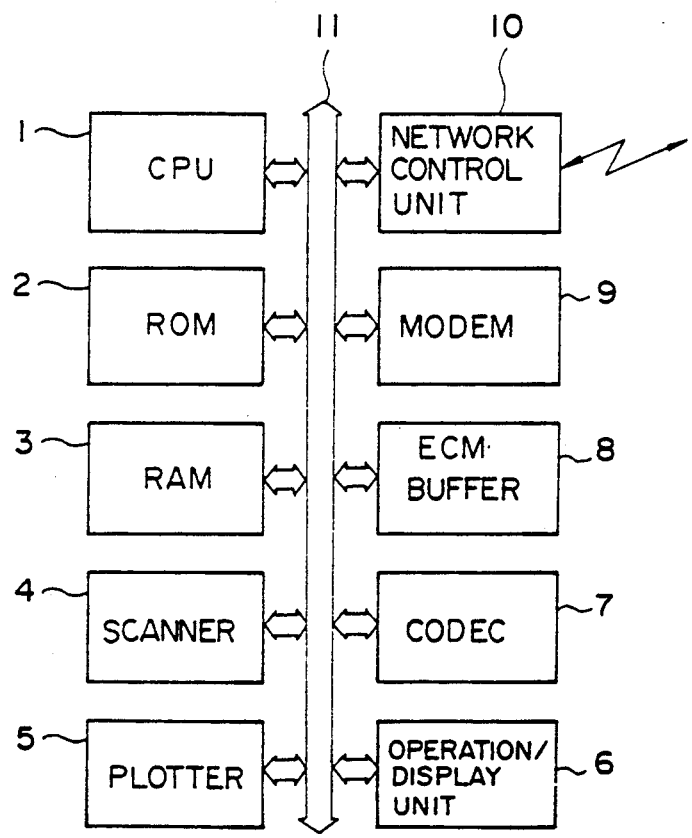
FIG. 3 is a block diagram of a first preferred embodiment of the present invention.

Referring to FIG. 3 which illustrates a facsimile machine of the first embodiment, a central processing unit (hereafter simply referred to as a CPU) 1 controls the entire facsimile machine, and executes a facsimile transmission control procedure. A read only memory (hereafter simply referred to as a ROM) 2 stores a control program which defines the operation of the CPU 1. A work area and a transmission buffer are formed in a random access memory (hereafter simply referred to as a RAM) 3. The transmission buffer has a storage capacity amounting to at least 64 Kbytes so as to store one bloc consisting of frames each having a maximum of 256 bytes. A scanner 4 is used to optically read a transmission document with a predetermined resolution. A plotter 5 is used to record and output a received image with a predetermined resolution. An operation and display unit 6 is used for operating the facsimile machine. A coder and decoder (hereafter simply referred to as a CODEC) 7 encodes and compresses a transmission image signal to be transmitted, and expands and decodes a received image signal to generate an original image signal. An error correction mode buffer (hereafter simply referred to as an ECM buffer) 8 is used to store image information processed in an error correction mode, and has a storage capacity amounting to at least 64 Kbytes so as to store at least one block consisting of frames each having a maximum of 256 bytes. A modulator/demodulator (hereafter simply referred to as a MODEM) 8 has a function of modulating and demodulating digital data so as to utilize, as transmission lines, public telephone lines, many of which are analog lines. A network control unit 10 is used for connecting the facsimile machine to a public telephone network. The network control unit 10 has an automatic transmit/receive function. The above-mentioned structural elements can communicate with each other through a system bus 11. Further, additional structural elements may be arbitrarily provided in the facsimile machine. For example, a parameter memory may be provided which stores a variety of parameters such as a reduction dial information exclusively used in the present facsimile machine.

The facsimile machine thus constructed is capable of sending and receiving image information in an error correction mode. The procedure of transmitting image information in the error correction mode is illustrated in FIG. 4.

Figure 4:
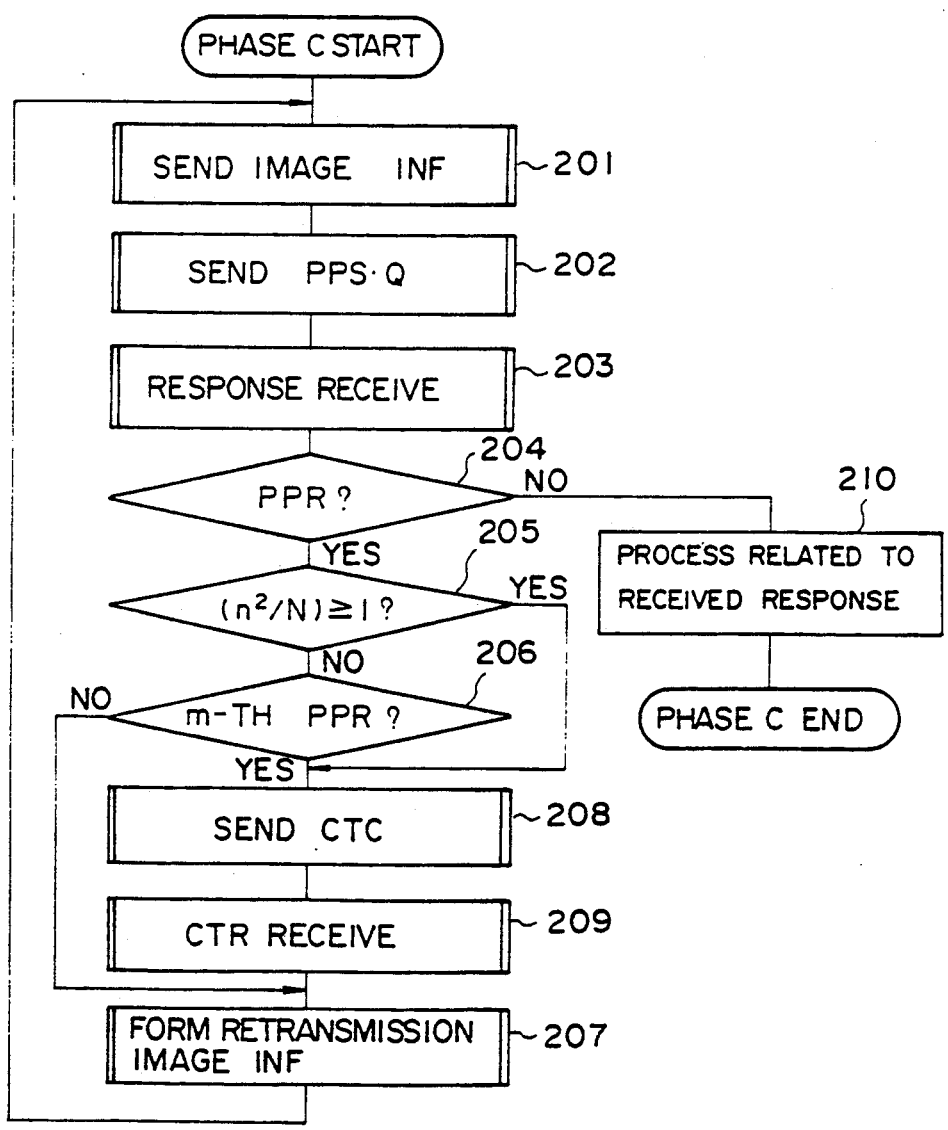
FIG. 4 is a flowchart of a process executed in the first embodiment.

Referring to FIG. 4, after phase C for image transmission is activated, image information amounting to one block is sent from a transmitter to a receiver (step 201). Then the transmitter sends the procedure signal PPS-Q (Q is MPS, EOM, EOP, PIR-Q) for instructing the operation to be carried out after the image information transmission (step 202), and waits for a response from the receiver (step 203).

Then, it is discerned whether or not the transmission procedure signal sent back from the receiver is the procedure signal PPR (step 204). When the result in step 204 is YES, an expected value ($n^2/N$) of transmission errors which may occur in the next retransmission is equal to or larger than 1 (step 205), where n is the number of frames each having a transmission error informed by the procedure signal PPR, and N is the total number of data frames which have been transmitted at that time. The CPU 1 can know the number n by referring to the aforementioned error map data EMp included in the incoming signal, and counts the number of data frames when each data frame is sent. Then, the CPU 1 calculates the expected value ($n^2/N$). It is noted that the probability (n/N) indicates the probability of occurrence of a transmission error in a unit of frame with respect to the image information transmission executed at that time. That is, the error ratio n/N indicates the percentage of error frames out of a total number of frames in the original transmission. Assuming that the conditions have not changed from the original transmission, this error ration also indicates the probable percentage of errors in the second transmission. Since there will be n frames during the second transmission and since only the error frames have been retransmitted, the number of errors which are likely to happen during the second transmission is:

$$n \times (n/N).$$

That is, the expected error ratio times the number of total frames. The result, $n^2/N$, indicates the total number of expected errors in the retransmission. This is often referred to as the expected value. Although this particular formula indicates the true number of the expected errors, it may be approximated by other similar functions such as $n(n-1)/N$ or similar functions based on square of the number of error frames divided by a function of the total number of frames.

When the result in step 205 is NO, there is a possibility that a reduced transmission error or no transmission error may occur at the time of retransmission, and therefore, it is determined whether or not the procedure signal PPR of concern has been received the m-th time (step 206 . The CPU 1 counts the number of the received procedure signals PPR. When the result in step 206 is NO, the transmitter forms retransmission image information consisting of one or more frames relating to the transmission errors indicated by the procedure signal PPR (step 206), where m is a predetermined number. On the other hand, when the result in step 205 is YES, there is a high possibility that a transmission error may occur in one or more frames at the time of retransmission. From this viewpoint, the transmitter sends the procedure signal CTC to inform that the transmission rate is shifted down by one step (step 208). Then the transmitter waits for the response of the procedure signal CTR sent back from the receiver (step 209).

When the procedure signal CTR is received, the transmission rate set by high-bit rate MODEM functions in the MODEM 9 is shifted down by one step, and retransmission image information is formed (step 207). Then procedure returns to step 201, where the above-mentioned retransmission image information is sent.

On the other hand, when the result in step 206 is YES, the number of times that the same block has been retransmitted reaches a predetermined number. Therefore, the processes in steps 208, 209 and 207 are sequentially executed. Then the procedure returns to step 201 where the retransmission image information is sent to the receiver.

When the result in step 204 is NO, the procedure proceeds according to a process related to the contents of the transmission procedure signal received in step 203, and then phase C ends.

In this manner, according to the first embodiment, when the procedure signal PPR is received, the expected value ($n^2/N$) indicating a possibility of the occurrence of transmission errors in the next retransmission is calculated, and the transmission rate is determined based on the calculated expected value.

Figure 5A:
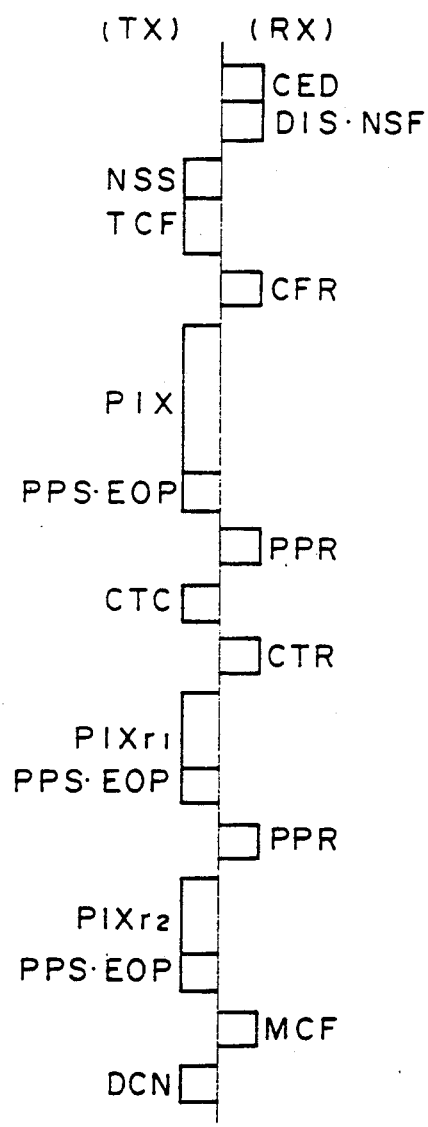
FIG. 5A is a timing chart illustrating a transmission procedure executed in the first embodiment.

In operation, an operator sets a transmission document in the scanner 4 of a transmitter facsimile machine (a transmitter (TX)) having the structure of FIGS. 3 and 4, and sets the error correction mode. Then the operator inputs a desired receiver facsimile machine (a receiver (RX)) having the same function as the transmitter, and thereafter depresses a start key provided in the operation and display unit 6 (FIG. 3). Then the image information is transmitted in accordance with the procedure as shown in FIG. 5A. In FIG. 5A, it is assumed that the document set in the scanner 4 is a sheet of paper, and the size of image information obtained by coding and compressing images recorded on the document is equal to or less than 64 Kbytes and can be arranged in one block. Although the following operation in each of the transmitter and receiver is actually controlled by the CPU 1 thereof, the following description is given as the entire operation of the transmitter and receiver themselves.

At the commencement of facsimile transmission, the transmitter calls the receiver, which sends back a called station identification signal CED, which indicates that it is a non-speech terminal. Then the receiver informs the transmitter of standard and optional functions available therein by sending a digital identification signal DIS and a non-standard facility signal NSF, respectively. Then the transmitter informs the receiver of a function to be used in the present transmission by sending the non-standard facility signal NSS, and carries out a training check TCF. When the training check TCF is good, the receiver sends the transmitter a response signal CFR indicating the results of the training check. In response to the response signal CFR, the transmitter starts sending image information PIX. At this time, under the control of the CPU 1, the scanner 4 reads the transmission document, and the CODEC 7 encodes and compresses an image signal supplied from the scanner 4 to generate image data. Then, the image data thus generated is shaped into frame data in conformity with the aforementioned HDLC frame format, and is then stored in the transmission buffer formed in the RAM 3. Then the frame data is transferred to the MODEM 9, and is thereby modulated and sent to the receiver through the network control unit 10. Then when the image information PIX amounting to one page is completely transmitted, a set of the procedure signal and end-of-procedure signal EOP is sent to the receiver, whereby the receiver is informed of the end of physical one page.

On the other hand, the receiver stores the received image information in the RAM 3, and determines whether or not a transmission error or data error occurs in each of the data frames by referring to the frame check sequence FCS. Then, when the receiver finds that a transmission error occurs in one or more frames from the results of the frame check sequence FCS, the receiver sends the transmitter the aforementioned procedure signal PPR, whereby the transmitter is informed of data frames for which a data error is detected.

When receiving the procedure signal PPR, the transmitter executes the aforementioned process, and thereby calculates the expected value ($n^2/N$) of the number of frames in which transmission error may occur in retransmission. Then, the transmitter sends the receiver the procedure signal CTC, when the expected value ($n^2/N$) is equal to or larger than 1. For example, the expected value is equal to or larger than 1 when a condition on the line is bad, and a large number of data frames are requested to be retransmitted. When receiving the procedure signal CTC, the receiver has the MODEM 9 shift down the transmission rate by one step, and then sends back the procedure signal CTR to the transmitter. Thereby, the transmitter transmits (retransmits) image information PIXr1 consisting of data frames related to the designated frame numbers at a transmission rate obtained by shifting down the current transmission rate by one step. When the receiver detects a transmission error from the received the image information PIXr1, it sends back the procedure signal PPR in the same way as the aforementioned process, and informs the transmitter of data frames in which a transmission error occurs.

When receiving the procedure signal PPR, the transmitter calculates the expected value ($n^2/N$) of the number of frames which may occur in the next retransmission. At this time, when the calculated expected value is smaller than 1, the transmitter sends image information PIXr2 which consists of data frames related to only the designated one or more frame numbers. Then after the above transmission of the image information PIXr2 ends, the transmitter sends the receiver the signal PPS-EOP which indicates the completion of image information. The receiver sends back a message confirmation signal MCF when correctly receiving the image information PIXr2. Thereby, the transmitter confirms that the transmission of the image information is correctly completed. Then the transmitter sends the receiver a disconnect signal DCN, whereby the transmission line being used is released from the connected state, and the image information transmission ends.

Figure 5B:
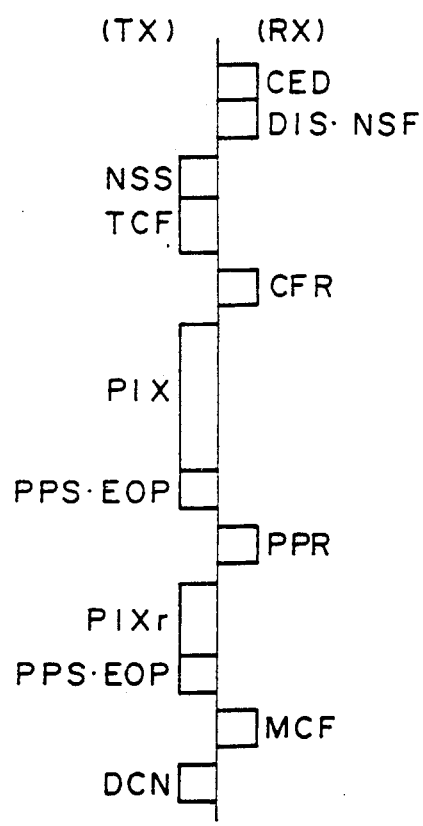
FIG. 5B is a timing chart illustrating another transmission procedure executed in the first embodiment.

On the other hand, as shown in FIGS. 5B, when the conditions of the transmission line are good and the number of frames in which a transmission error occurs, is not so large, the transmitter does not transmit the procedure signal CTC, and therefor sends the image information PIXr consisting of data frames related to the one or more frame numbers designated by the procedure signal PPR sent back from the receiver.

According to the above-mentioned first embodiment, in the case where a transmission error occurs frequently, the transmission rate is shifted down by one step in the first retransmission. Therefore, in many cases, all the correct image information can be given the receiver by retransmitting the requested data frames (error frames) just one time. As a result, it is possible to reduce the total time it takes to transmit image information.

The expected value ($n^2/N$) assumes a large value in the case where the total number of frames to be transmitted is small. From this viewpoint, there is a possibility that the expected value ($n^2/N$) becomes equal to or larger than 1 in the retransmission where the number of frames to be transmitted is small, even when the number of frames which are requested to be retransmitted is small. In such a case, the transmission rate set in the retransmission is gradually reduced as the retransmission is repetitively requested, and thereby it may take long to retransmit the requested data frames. In order to avoid the above-mentioned inconvenience, the control of the transmission rate based on the expected value ($n^2/N$) may be carried out only when the retransmission of image information is requested for the first time.

Figure 6:
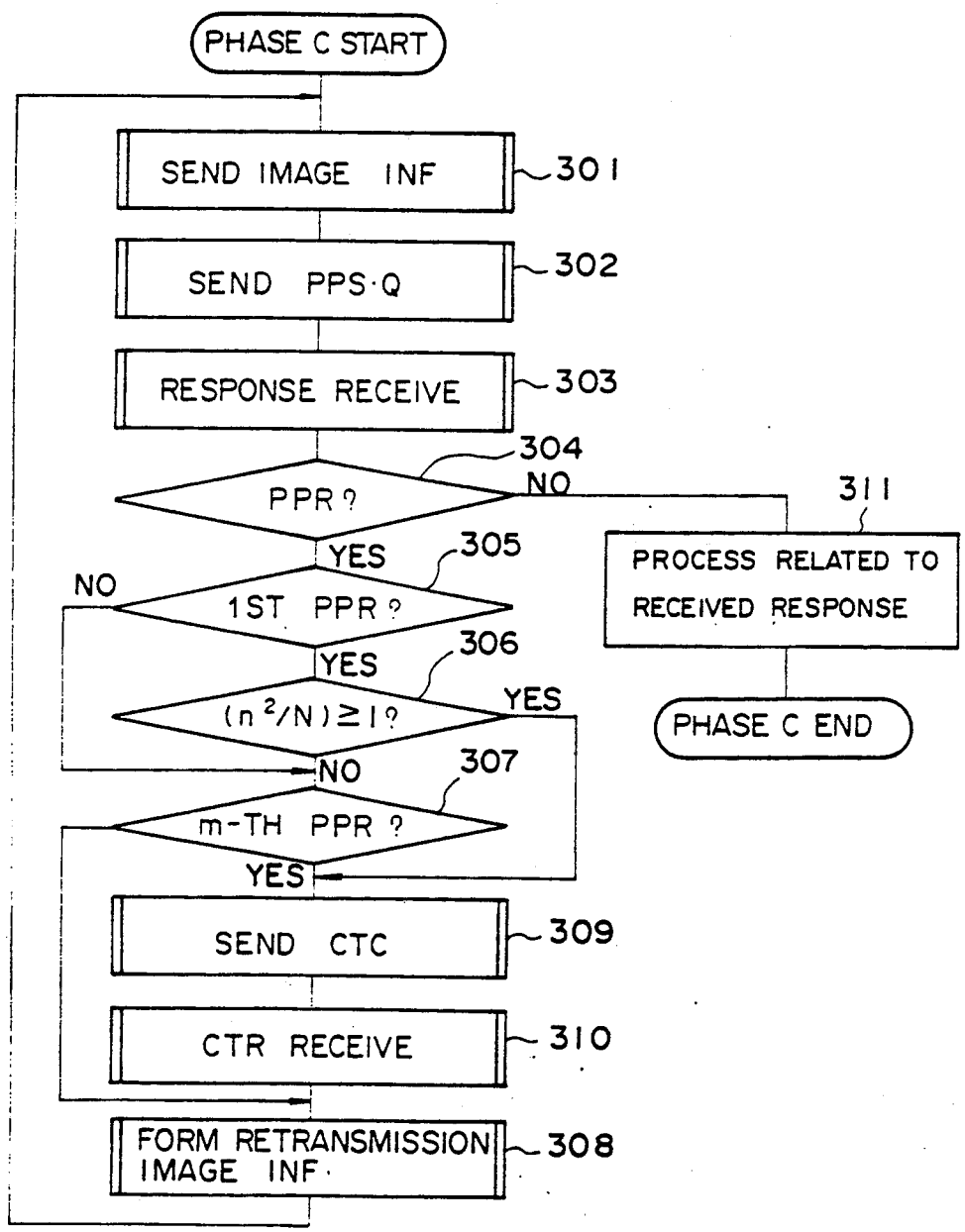
FIG. 6 is a flowchart of another process executed in the first embodiment.

This is illustrated in FIG. 6. Referring to FIG. 6, after starting phase C, the transmitter sends the receiver image information amounting to one block (step 301), and the procedure signal PPS-Q which instructs the operation after the transmission of the image information (step 302). Then, the transmitter waits for the response sent back from the receiver.

After receiving the response from the receiver (step 303), the transmitter determines whether or not the received transmission procedure signal is the procedure signal PPR (step 304). When the result in step 304 is YES, it is discerned whether or not the current procedure signal PPR is the first procedure signal PPR (step 305). When the result in step 305 is YES, the current request for retransmission is the first one, and it is presumed that a large number of data frames is requested to be retransmitted. Therefore, it is determined whether or not the expected value ($n^2/N$) for the next retransmission is equal to or larger than 1 (step 306). When the result in step 306 is NO, it is determined whether or not the procedure signal PPR of concern is a signal received the m-th time (step 307). When the result in step 307 in NO, the transmission forms retransmission image information consisting of one or more frames relating to transmission errors indicated by the procedure signal PPR (step 308). Then the procedure returns to step 301 where the retransmission image information is transmitted.

When the result in step 306 is YES, the transmitter transmits the procedure signal CTC (step 308), and waits for the response of the procedure signal CTR for the procedure signal CTC sent back from the receiver (step 309). When receiving the procedure signal CTR, the transmission rate achieved by high-bit rate MODEM functions presented by the MODEM 9 is shifted down by one step. Then the retransmission image information is formed (step 308), and is transmitted to the receiver (set 301). The result in step 307 is YES, when the number of times the same block is retransmitted, reaches a predetermined number, and therefore the processes in steps 309, 310 and 308 are sequentially carried out. Then the procedure returns to step 301, and the retransmission image information is sent to the receiver.

The result in step 305 is NO, when the retransmission request has occured two or more times. Therefore it is presumed that the total number of frames N to be transmitted is small. Therefore, the process in step 306 is skipped and the procedure proceeds to step 307, where it is discerned whether or not the retransmission request of concern is the m-th retransmission request.

When the result in step 304 is NO, the transmitter executes the process related to the contents of the transmission procedure signal received at that time (step 310), and then ends phase C.

In this manner, according to the embodiment, the discrimination process in step 306 is carried out only when the request for retransmission is received for the first time. Thereby, it becomes possible to avoid the unnecessary reduction of the transmission rate and thereby reduce the total time it takes to transmit image information.

As described previously, it is determined, on the basis of the number of times retransmission is requested, as to whether or not the discrimination process in step 306 should be skipped. Alternatively, it may be determined whether or not the discrimination process in step 306 should be skipped based on the total number of data frames to be transmitted. In this case, the discrimination process in step 306 is made valid when the total number of data frames, N, to be transmitted is equal to or larger than a predetermined value. On the other hand, when the total number of data frames to be transmitted is smaller than the predetermined value, the discrimination process in step 306 is made invalid.

Figure 7:
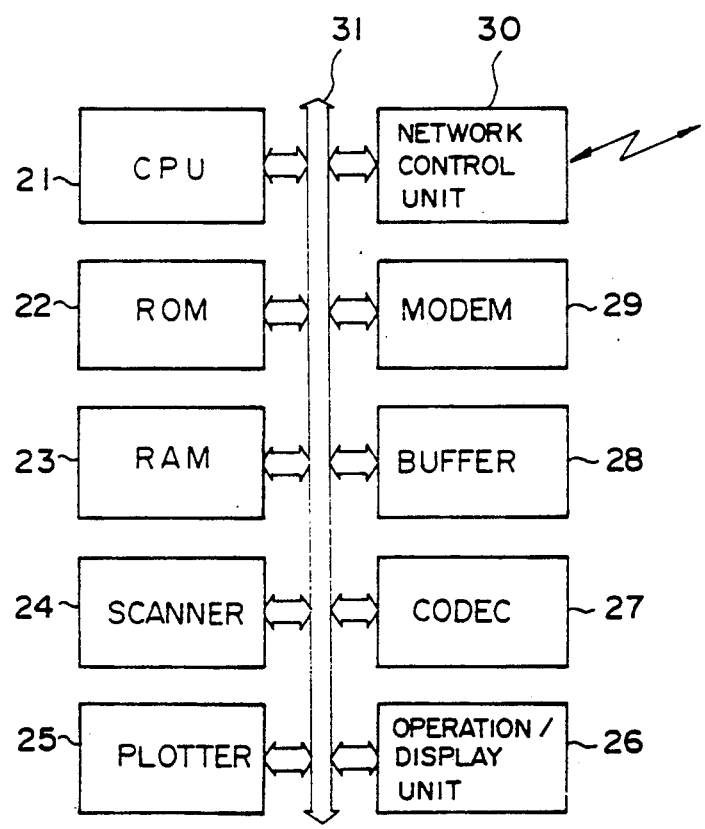
FIG. 7 is a block diagram of a second preferred embodiment of the present invention.

A description is given of a second preferred embodiment of the present invention. Referring to FIG. 7, there is illustrated a facsimile machine of the second embodiment. The block diagram of FIG. 7 is almost the same as that shown in FIG. 3. However, functions of some structural parts, especially a CPU 21, are different from those of the corresponding parts shown in FIG. 3. Referring to FIG. 7, the CPU 21 controls the entire facsimile machine, and executes a facsimile transmission control procedure described later. A ROM 22 stores a control program which defines operation of the CPU 1. A work area and a transmission buffer are formed in a RAM 23. The transmission buffer has a storage capacity amounting to at least 64 Kbytes so as to store one block consisting of frames each having a maximum of 256 bytes. A scanner 24 is used to optically read a transmission document with a predetermined resolution. A plotter 25 is used to record and output a received image with a predetermined resolution. An operation and display unit 26 is used for operating the facsimile machine. A CODEC 27 encodes and compresses a transmission image signal, and expands and decodes a received image signal to generate an original image signal. An ECM buffer 28 is used to store image information processed in an error correction mode, and has a storage capacity amounting to at least 64 Kbytes so as to store at least one block consisting of frames each having a maximum of 256 bytes. A MODEM 28 has a function of modulating and demodulating digital data so as to use, as transmission lines, public telephone lines, many of which are analog lines. A network control unit 30 is used for connecting the facsimile machine to a public telephone network. The network control unit 30 has an automatically transmitting/receiving function. The above-mentioned structural elements can communicate with each other through a system bus 31.

Figure 8A:
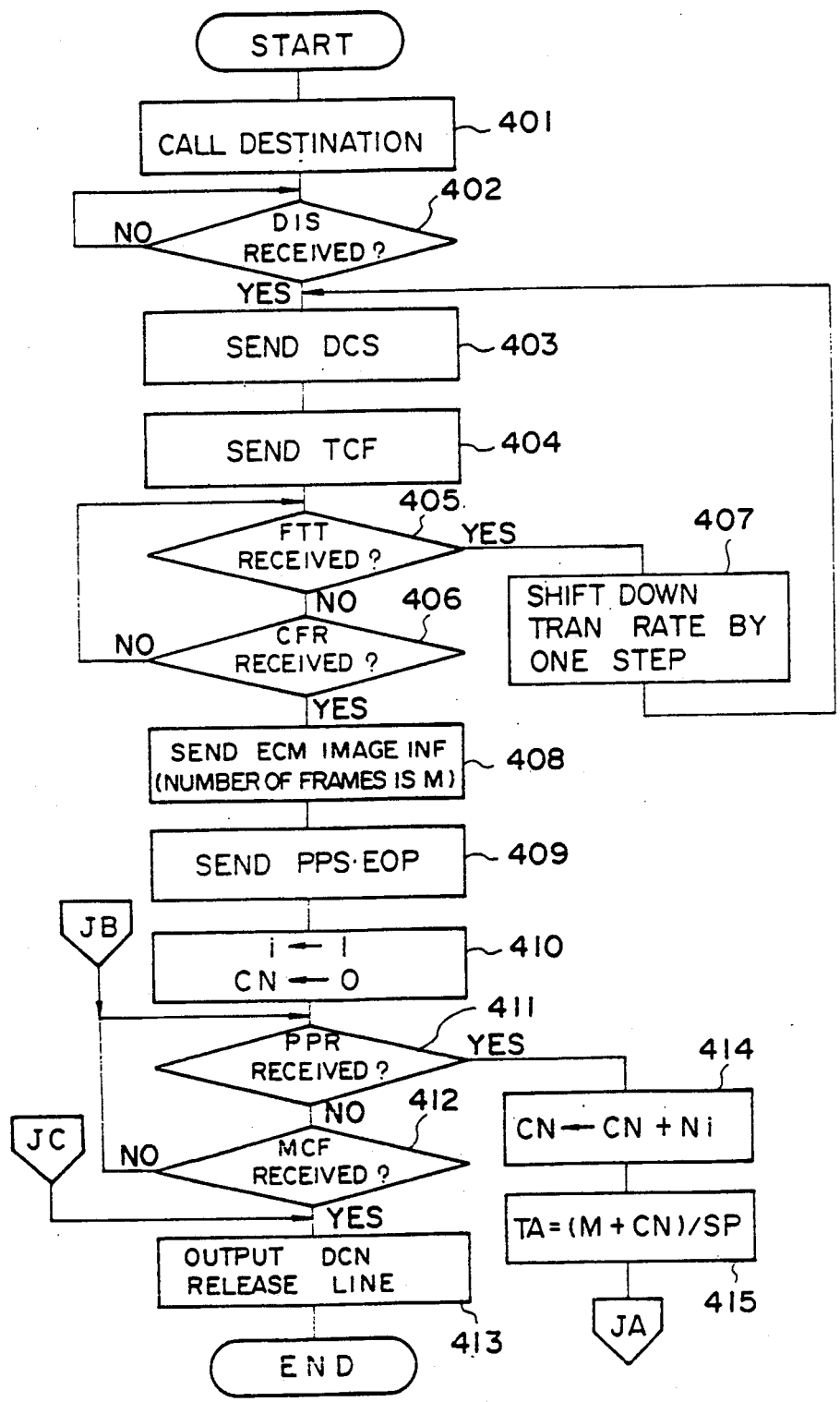
FIGS. 8A through 8C are flowcharts illustrating a transmission process executed in the second embodiment.
Figure 8B:
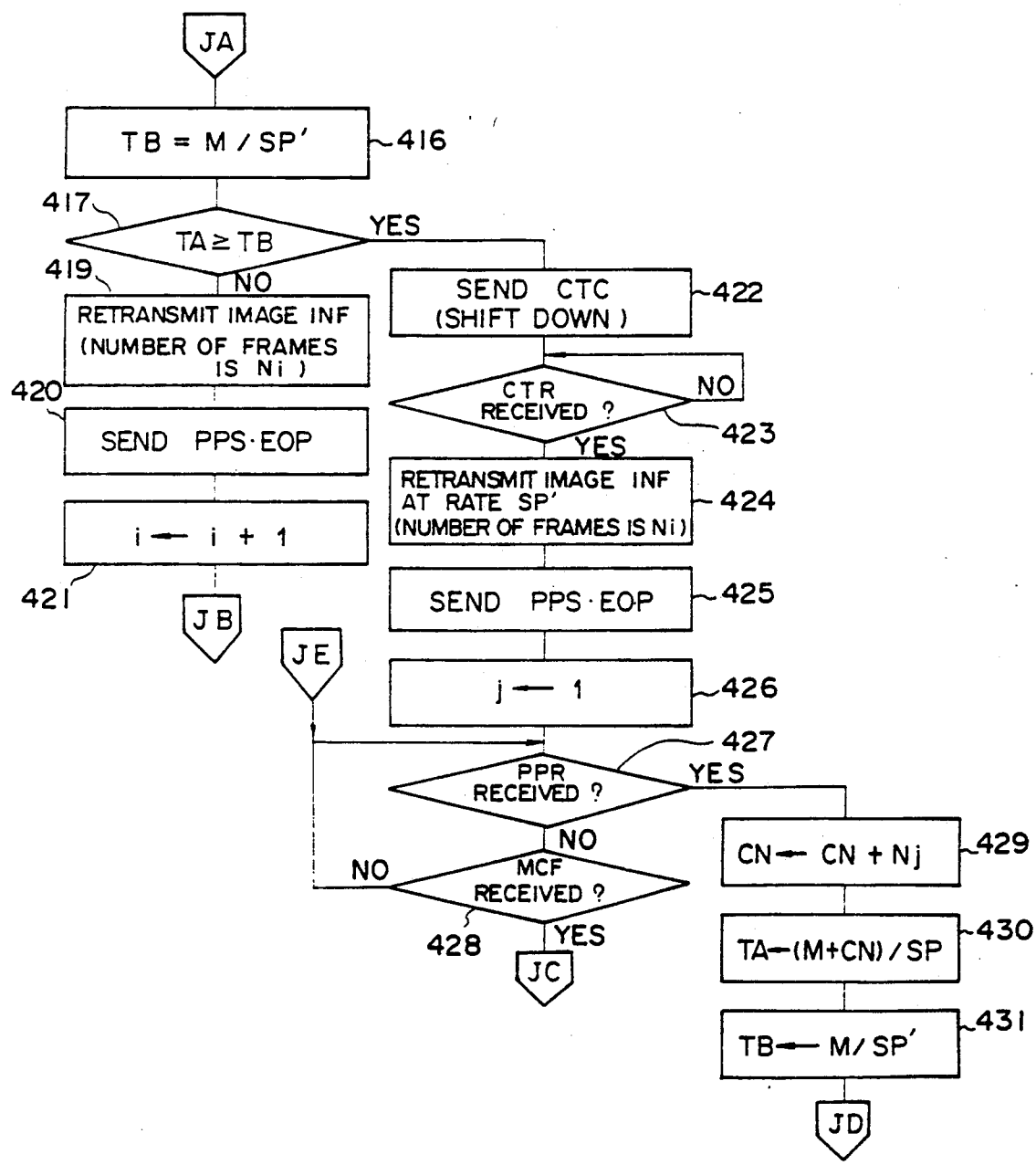
Figure 8C:
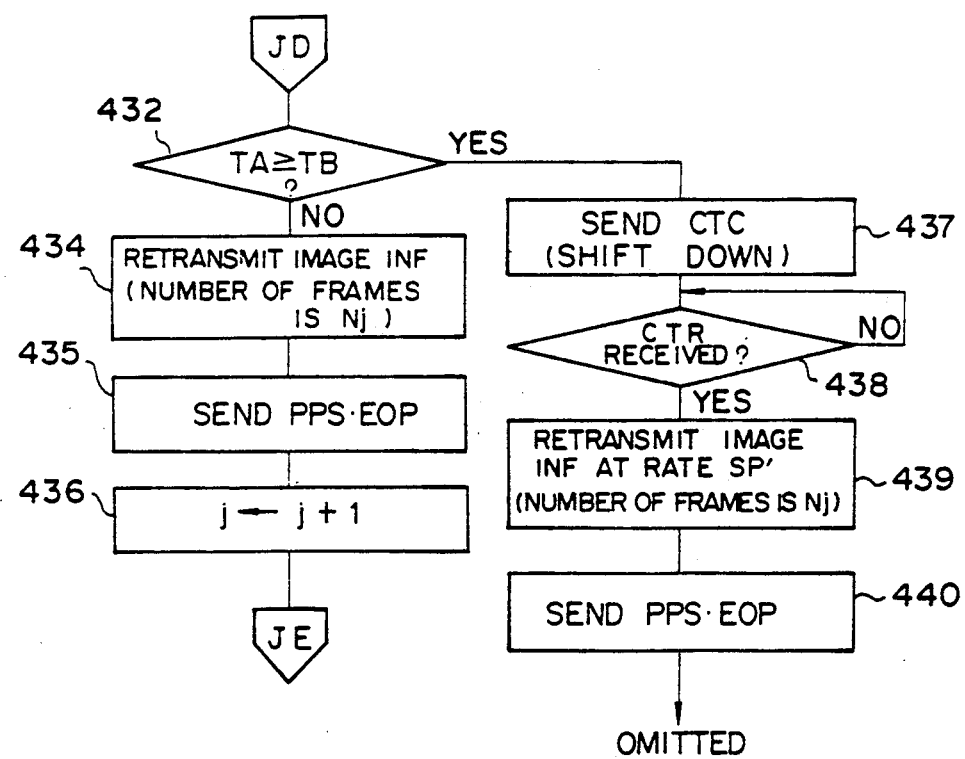

FIGS. 8A through 8C shows the second embodiment of the present error correction procedure which is controlled and executed by the CPU 21. The following description relates to a case where image information which can be arranged in one block and amounts to one page, is transmitted.

Referring to FIG. 8A, a transmitter calls a destination receiver (step 401), and waits for the digital identification signal DIS which is sent back from the receiver and indicates terminal functions available at the receiver (a loop related to step 402). When the result in step 402 is YES, the transmitter sends the procedure signal DCS which indicates a transmission function including an error correction mode to be used (step 403). Then the transmitter sends the training check signal TCF in order to carry out the training check at a MODEM rate (transmission rate) set when sending the procedure signal DCS (step 404). Then the transmitter waits for a procedure signal FTT or CFR sent from the receiver. The procedure signals FTT and CFR are signals used for informing the transmitter of the receiving results of the training check TCF sent back from the transmitter. When the procedure signal FTT is received (where the result in step 405 is YES), the transmission rate is shifted down by one step. Then the procedure returns to step 403, and the transmitter sends the receiver the procedure signal DCS which indicates that the transmission rate is shifted down by one step. This procedure aims to adjust the transmission rate before necessary transmission data is actually sent to the receiver. Alternatively, when the procedure signal CFR is received (where the result in step 405 is NO), the image information transmission based on the error correction mode is carried out (step 408). The number of data frames to be transmitted at that time is represented as M. When the process in step 408 ends, the transmitter sends the receiver the procedure signal PPS-EOP which represents that all the messages have been sent (step 409).

Next, a control variable i is set to 1, and a counter CN is set to 0 to thereby initialize the counter CN (step 410). The counter CN is a program counter which is managed by the CPU 21. The control variable i and the counter CN are provided in the program which the CPU 21 executes. The transmitter waits for the procedure signal PPR or MCF (message confirmation signal) sent back from the receiver (a "NO" loop related to steps 411 and 412). When the procedure signal MCF is received (where the result in step 412 is YES), which means that all the frame data have correctly been received, the transmitter outputs the disconnect signal DCN which instructs disconnection of the line being used, whereby the line is released from the connected state (step 413). Then the transmission ends.

Alternatively, when the procedure signal PPR is received (where the result in step 411 is YES), the counter CN is renewed in such a manner that a total number Ni of data frames each having a transmission error is added to the value in the counter CN (CN←CN+Ni; step 414). The CPU 21 counts the number of data frames. Then the CPU 21 of the transmitter calculates a time TA it takes to retransmit the requested data frames at the transmission rate SP being set (TA=(M+CN)/SP; step 415), and a time TB it takes to transmit the M number of previously transmitted data frames at a transmission rate SP' available after shifting down by one step (TB=M/SP'; step 416). Then, it is determined by the CPU 21 as to whether the time TA is equal to or larger than the time TB (step 417). When the result in step 417 is NO, the transmitter forms retransmission image information (the number of data frames is Ni) which consists of the requested one or more data frames, and sends the same to the receiver (step 419). Then the transmitter sends the receiver the procedure signal PPS-EOP (step 420). Then the control variable i is incremented by 1 (step 421), and the procedure returns to step 411 to wait for the response signal sent back from the receiver.

On the other hand, if the result in step 417 is YES, the transmitter sends the receiver the continue-to-correct signal CTC which represents that the transmission rate is shifted down by one step (step 422), and waits for the response sent back from the receiver (a "NO" loop related to step 423). When the response signal CTR is received and the result in step 423 is YES, the transmitter forms retransmission image information (the number of frames is Ni) which consists of the requested data frames, and sends the receiver the same at the shifted-down transmission rate SP' (step 424), and outputs the procedure signal PPS-EOP (step 425).

Next, in order to execute the same process as the above-mentioned process at the shifted-down transmission rate SP', a control variable j is set to 0 to initialize the control variable j (step 426), and the transmitter waits for either the procedure signal PPR or MCF from the receiver (a "NO" loop related to steps 427 and 428). Then the procedure returns to step 413 when the procedure signal MCF is sent back from the receiver and the result in step 428 is YES, which means that all the data frames have correctly been received at the receiver. Alternatively, when the procedure signal PPR is sent back from the receiver (where the result in step 427 is YES), the CPU 21 of the transmitter renews the counter CN by adding the total number Nj of the data frames which are indicated as error frames by the receiver to the value in the counter CN (CN←CN+Nj; step 429). Then the transmitter calculates a time TA it takes to retransmit the requested data frames at the transmission rate SP (in this case, it is the transmission rate obtained by shifting the original transmission rate by one step; step 430). In other words, the transmitter calculates (M+CN)/SP. Further the transmitter calculates a time TB it takes to transmit, at a transmission rate SP', the M number of the first transmitted data frames (in this case, it is the transmission rate obtained by shifting down the original transmission rate by two steps; step 431). In other words, the transmitter calculates M/SP'. Then, it is discerned whether or not the time TA is equal to or larger than the time TB (step 432).

When the result at step 432 (FIG. 8C) is NO, the transmitter forms retransmission image information (the number of frames is Nj) which consists of th retransmission frames requested at that time and sends the same to the receiver (step 435). Then the transmitter sends the receiver the procedure signal PPS-EOP (step 435). Then the control variable j is incremented by 1, and the procedure returns to step 427 to waits for the response sent back from the receiver.

When the result in step 432 is YES, the transmitter sends the receiver the procedure signal CTC which represents the transmission rate is shifted down by one step (step 437), and waits for the response of the procedure signal CTR (a "NO" loop related to step 438). When the procedure signal CTR is received and the result in step 438 is YES, the transmitter forms retransmission image information (the number of frames is Nj) which consists of the data frames requested at that time at the shifted-down transmission rate, and sends the same to the receiver (step 439). Then the transmitter sends the receiver the procedure signal PPS-EOP (step 440). Thereafter, the process is carried out in the same way as the above. For example, the procedure returns step 411 shown in FIG. 8A.

According to the second embodiment, the transmission rate is determined on the basis of the calculated times TA and TB, and thereby it becomes possible to determine the optimum transmission rate depending on conditions of the line being used. As a result, it becomes possible to reduce the total time necessary for image information transmission.

A transmission procedure based on the second embodiment is illustrated in FIG. 9A. When a transmitter (TX) calls a receiver (RX), the receiver sends the transmitter the called station identification signal CED and digital identification signal DIS. Then the transmitter sets one of the transmission functions based on the procedure signal DIS, and informs the receiver of the setting result by the signal DCS. Then the transmitter sends the receiver the training check signal TCF at a transmission rate set in the above-mentioned process, and waits for the training results sent back from the receiver.

When the training check is good, the receiver sends back the procedure signal CFR. In response to the signal CFR, the transmitter sends the receiver image information PIX consisting of M data frames where the error correction mode is set, and the procedure signal PPS-EOP. At this time, when the receiver detects one or more error frames, the receiver informs the transmitter of one or more frames having a transmission error by a procedure signal PPR($N_1$). When receiving the procedure signal PPR($N_1$), the transmitter calculates times TA and TB in accordance with the aforementioned process, and investigates the relationship in magnitude between them. In the illustrated case, the time TA is shorter than the time TB. Therefore, the transmitter sends the receiver image information PIXr1 which consists of N1 error frames informed by the procedure signal PPR(N1) at the same transmission rate, and thereafter outputs the procedure signal PPS-EOP. In the present case the receiver detects the presence of one or more error frames. When one or more error frames are detected, the receiver informs the transmitter of the same by a procedure signal PPR($N_2$). When receiving the procedure signal PPR($N_2$), the transmitter calculates the times TA and TB in accordance with the aforementioned procedure, and investigates the relationship in magnitude between them. In the illustrated case, the time TA is equal to or larger than time TB. Therefore, the transmitter sends the receiver the procedure signal CTC which indicates that the transmission rate is shifted down by one step. When completing the setting of the new transmission rate in the MODEM 29, the receiver sends back the procedure signal CTR. In response to the procedure signal CTR, the transmitter forms retransmission image information which consists of $N_2$ error frames informed by the procedure signal PPR($N_2$), and sends the receiver the same at the shifted-down transmission rate. Then the transmitter outputs the procedure signal PPS-EOP. In the illustrated case, the receiver detects no error frame, and therefore sends back the procedure signal MCF. In response to the signal MCF, the transmitter outputs the disconnect signal DCN to release the line. Then the image information transmission ends.

Figure 10A:
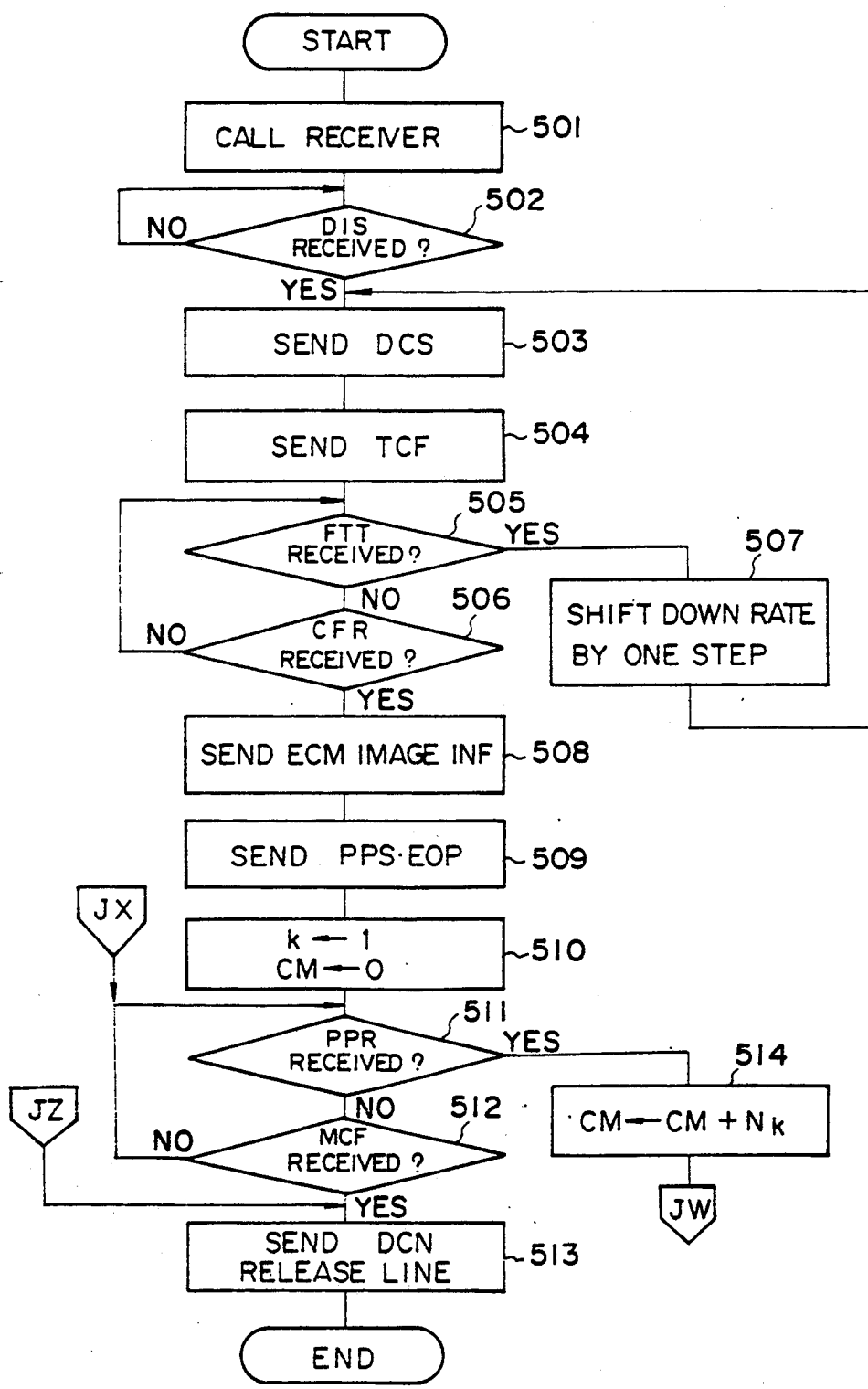
FIGS. 10A and 10B are flowcharts illustrating another transmission process executed in the second embodiment.
Figure 10B:
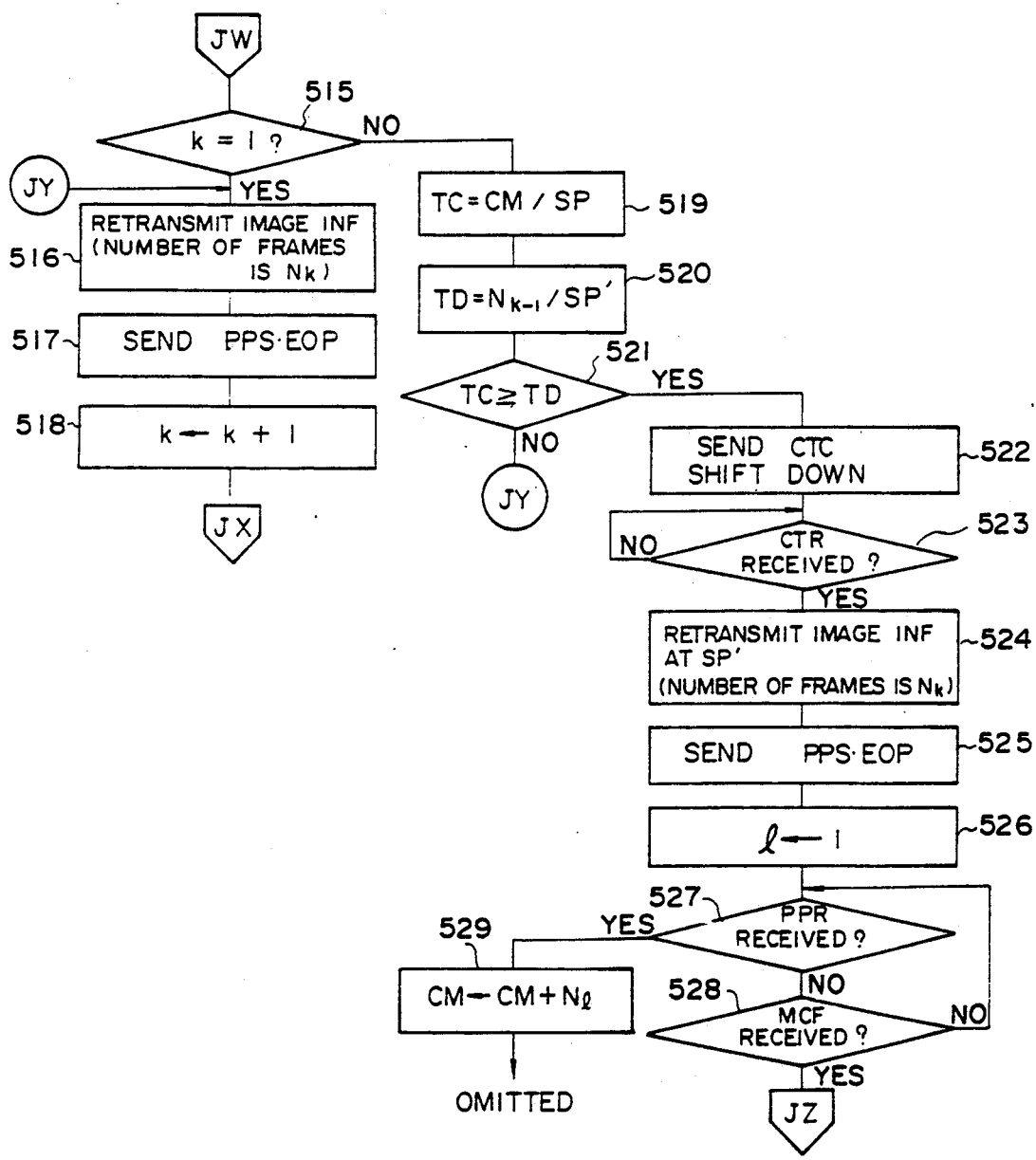

Alternatively, the shift down operation may be controlled based on only the number of data frames to be retransmitted. FIGS. 10A and 10B show a procedure based on the above-mentioned alternative. Steps 501–506 shown in FIG. 10A correspond to step 401–406. After that, image information is transmitted in the error correction mode (step 508). When all the image information is completely transmitted, the corresponding signal PPS-EOP is sent to the receiver (step 509). Next, a control variable k is set to 1 to initialize the same, and a counter CM used for storing the number of retransmission frames (step 510). The counter CM is a program counter and is managed by the CPU 21. Then the transmitter waits for the procedure signal PPR or MCF sent back from the receiver (a "NO" loop related to steps 511 and 512).

When the procedure signal MCF is returned from the receiver (where the result in step 512 is YES), the transmitter outputs the disconnect signal DCN which instructs the disconnection of the line being captured (step 513). Then the transmission ends. On the other hand, when receiving the procedure signal PPR (where the result in step 511 is YES), the transmitter renews the counter CM by adding the total number Nk of data frames which are indicated as error frames to the contents of the counter CM (step 514). Then it is determined whether or not the value of the control variable i is equal to 1 (step 515 shown in FIG. 10B). When the result in step 515 is YES, the transmitter forms retransmission image information (the number of data frames is Nj) which consists of one or more data frames for which retransmission is requested at that time, and sends the receiver the same (step 516). Then the transmitter outputs the corresponding procedure signal PPS-EOP (step 517). Then the control variable k is incremented by 1 (step 518), and the procedure returns to step 511 where the transmitter waits for the corresponding response sent back from the receiver.

When the result in step 515 is NO, the CPU 21 of the transmitter calculates a time TC it takes to retransmit all the requested data frames indicated by the contents of the counter CM at a transmission rate being set, and a time TD it takes to transmit, at a transmission rate available after shifting down, $N_{k-1}$ number of data frames which are requested to be retransmitted one time before the present retransmission request (steps 519 and 520). Then it is discerned whether or not the time TC is equal to or larger than the time TD (step 521). When the result in step 521 is NO, the procedure returns to step 516, whereby the transmitter retransmits the image information consisting of one or more error frames for which retransmission is requested at that time. On the other hand, when the result in step 521 is YES, the transmitter sends the receiver the procedure signal CTC which represents that the transmission rate is shifted down by one step (step 522), and waits for the response of the procedure signal CTR from the receiver (a "NO" loop related to step 523). When the procedure signal CTR is received and the result in step 523 is YES, the transmitter forms retransmission image information (the number of data frames is Nk) which consists of data frames for which retransmission is requested at that time, and sends the receiver the same (step 525). Thereafter, the transmitter outputs the procedure signal PPS-EOP. Next, in order to execute the same process as the aforementioned process after the shifted-down transmission rate, a control variable 1 is set to one to initialize the same (step 526). Then, the transmitter waits for the procedure signal PPR or MCF sent back from the receiver (a "NO" loop related to steps 527 and 528).

When the procedure signal MCF is sent back from the receiver and the result in step 528 is YES, the procedure proceeds to step 513, because all the data frames have been received without transmission errors at the receiver. On the other hand, when the procedure signal PPR is sent back from the receiver and the result in step 527 is YES, the CPU 21 of the transmitter renews the counter CM by adding the total number N1 of the data frames which are informed as error frames to the value in the counter CM (step 529). Then the process as the same as the above is carried out at the shifted-down transmission rate.

A procedure of the transmission related to the above-mentioned case is illustrated in FIG. 9B. A preprocessing of transmission and the first transmission of image information is carried out as in the case of the procedure shown in FIG. 9A. In the illustrated case, the receiver detects at least one error frame. Therefore by using the procedure signal PPR($N_1$), the receiver informs the transmitter of one or more frames in which transmission errors are detected. When receiving the procedure signal PPR($N_1$), the transmitter forms image information PIXr1 which consists of N1 error frames indicated by the receiver, and sends the receiver the same at the same transmission rate. Then the procedure signal PPR-EOP is transmitted. In the illustrated case, the receiver detects one or more error frames. Then the receiver informs the transmitter of the error frames by using the procedure signal PPR($N_2$). When receiving the procedure signal PPR($N_2$), the transmitter calculates the aforementioned times TA and TB, and investigates in magnitude between the times TA and TB. In the illustrated case, the time TA is smaller than the time TB. Therefore, the transmitter forms image information PIXr2 consisting of N2 error frames informed by the procedure signal PPR($N_2$), and sends the receiver the same at the same transmission rate. Then the procedure signal PPR-EOP is transmitted. In the illustrated case, the receiver detects one or more error frames. Therefore, the receiver informs the transmitter of the detected error frames by a procedure signal PPR($N_3$).

When receiving the procedure signal PPR($N_3$), the transmitter calculates the aforementioned times TA and TB, and investigates the relationship in magnitude between them. In the illustrated case, the time TA becomes equal to or larger than the time TB. Therefore, the transmitter informs the receiver that the transmission rate is shifted down by one step by the procedure signal CTC. When completing the setting of the informed transmission rate in the MODEM 29, the receiver sends back the procedure signal CTR. Thereby, the transmitter forms image information PIXr3 consisting N3 error frames informed by the procedure signal PPR($N_3$), and sends the receiver the same at the shifted-down transmission rate. Then the procedure signal PPS-EOP is transmitted. In the illustrated case, the receiver detects no error frame, and therefore sends the transmitter the procedure signal DCN to release the line being used. Then the transmission is terminated. The receiver releases the line in response to the received procedure signal DCN.

In the above-mentioned procedures, the transmission rate is shifted down based on only the comparison results between the times TA and TB or between the times TC and TD. It is possible to control the shift down operation based on the number of times the procedure signals are sent back the receiver as the CCITT recommendation in addition to the aforementioned comparison results.

It is noted that in the case where image information is transmitted in the error correction mode, an increased transmission time may be taken when a number of retransmissions must be carried out. In order to reduce the above possibility, it becomes possible to suppress retransmission of image information and reduce the transmission time by setting a transmission rate at which the rate of occurrence of transmission errors is very small in the error correction mode. For this purpose, the training check executed as the preprocessing of the transmission is employed with strict values used in the training check, compared with those for the normal mode. This procedure may be used with all of the previous embodiments.

FIG. 11 illustrates a procedure of still another embodiment based on the above-mentioned training check. Referring to FIG. 11, when receiving a call from a transmitter (step 601), the receiver sends back the procedure signals CED and DIS (steps 602–603) in this order, and waits for the response of the procedure signal DCS from the transmitter (a "NO" loop related to step 604). When the procedure signal DCS is sent back from the receiver, and the result in step 604 is YES, it is investigated whether or not the error correction mode is set (step 605). When the result in step 605 is NO, the transmitter receives the training check signal TCF subsequent to the procedure signal DCS, and determines whether or not the number of bits related to data errors exceeds a standard value, 15, for example (step 606). When the received results are determined to be good from the discrimination result (where the result in step 607 is YES), the receiver sends the transmitter the procedure signal CFR (step 608), and executes a subsequent procedure (normal procedure). Adversely, when the receiving results are poor (where the result in step 607 is NO), the receiver sends the transmitter the procedure signal FTT (step 609), and the procedure returns to step 604. When the result in step 605 is YES, the receiver receives the training check signal TCF transmitted subsequent to the procedure signal DCS, and investigates whether or not the number of bits related to data errors exceeds a reference value used in the error correction mode, 0, for example (step 610).

When the receiving results are good from the discrimination results (where the result in step 611 is YES), the receiver sends the transmitter the procedure signal CFR (step 612), and performs the subsequent procedure (error correction mode procedure). On the other hand, when the receiving results are not good from the discrimination results (where the result in step 611 is NO), the receiver send the transmitter the procedure signal FTT (step 613).

In this manner, the training check used in the error correction mode is more strictly defined. Therefore, a decreased transmission rate is determined in case where the conditions on the line being used are poor, while an increased transmission rate is determined in case where the conditions on the line are relatively good. Consequently, the rate of occurrence of transmission errors is suppressed to a smaller value, and a reduced transmission time can be obtained.

In the above-mentioned embodiment, the discrimination in the error correction mode uses the reference that the number of bit errors is set equal to zero. Of course, an arbitrary number may be used.

The present invention has been described in the embodiment of a facsimile machine. However, it is clear that it may also be applied to other types of digital transmission devices. Thus, in devices such as digital photocopies where a similar scanner and encoder is used to encode the information on the original document and this information is then forwarded to another part of the same machine for reproduction rather than sending it through transmission lines, the present invention may be used in similar fashion. Likewise, printers which receive digital information may equally well use this invention. Likewise any other type of device which uses digitized signals to transmit data may utilize the present invention. Likewise, this device may be used for a wireless type facsimile system which is becoming more important. That is, although traditionally facsimile machines are mostly used where they are connected to telephone lines, the system may equally well be used in a wireless system.

The present invention is not limited to the embodiments, and variations and modifications may be made without departing from the scope of the present invention.

What is claimed is:

1. A method for shifting down a data transmission rate at a transmitter in response to a request from a receiver for retransmission of data frames having data errors in a digital transmission system, comprising the steps of:
    transmitting a plurality of data frames of image information from said transmitter to said receiver through a line at a first data transmission rate;
    determining at said receiver as to whether or not each of said data frames contains one or more data errors;
    transmitting a request from said receiver to said transmitter for retransmission of one or more data frames for which one or more data errors have occurred;
    calculating the number of frames expected to contain errors during the time of retransmitting said one or more data frames for which one or more data errors have occurred, on the basis of a number of data frames requested to be retransmitted and a total number of data frames which have been transmitted from said transmitter to said receiver, the use of a second data transmission rate being determined based on the calculated number; and
    selectively shifting down said data transmission rate from said first data transmission rate to said second data transmission rate which is used for retransmitting said one or more data frames for which one or more data errors have occurred, wherein said number is represented as $(n^2/N)$ where n is said number of data frames requested to be retransmitted, and N is said total number of data frames which have been transmitted from said transmitter to said receiver.

2. A method as claimed in claim 1, wherein said number is a function of the square of the number of data frames to be retransmitted and the inverse of the total number of data frames which have been transmitted.

3. A method as claimed in claim 1, wherein when said number indicating a possibility of the occurrence of a data error is equal to or larger than a predetermined number, said data transmission rate is shifted down from said first data transmission rate to said second transmission rate.

4. A method as claimed in claim 1, further comprising a step of transmitting said one or more data frame requested to be transmitted at said first transmission rate without shifting down said data transmission rate, when said expected number indicating a possibility the occurrence of a data error is smaller than a predetermined number.

5. A method as claimed in claim 1, wherein each of said data frames is formed in conformity with a high-level data link control (HDLC) frame format.

6. A method as claimed in claim 1, wherein when said total number of data frames is equal to or larger than a predetermined number of data frames, and when said expected number is equal to or larger than a predetermined number, said data transmission rate is shifted down from said first data transmission rate to said second data transmission rate.

7. A method as claimed in claim 1, further comprising a step of determining how many times said request for retransmission of one or more data frames is transmitted from said receiver when said total number of data frames is smaller than a predetermined number of data frames, wherein when said determined number of times becomes equal to a predetermined number of times, said data transmission rate is shifted down from said first data transmission rate to said second data transmission rate.

8. A method as claimed in claim 1, wherein said digital transmission system is a facsimile system.

9. A method as claimed in claim 1, further comprising a step of determining how many times said request for retransmission of one or more data frames is transmitted from said receiver when said expected number indicating a possibility the occurrence of a data error is smaller than a predetermined number, wherein when said determined number of times becomes at least equal to a predetermined number of times, said data transmission rate is shifted down from said first data transmission rate to said second data transmission rate.

10. A method as claimed in claim 9, further comprising a step of transmitting said one or more data frames requested to be transmitted at said first transmission rate without shifting down said data transmission rate, when the determined number of times is less than said predetermined number of times.

11. A method for shifting down a data transmission rate at a transmitter in response to a request from a receiver for retransmission of data frames having data errors in a digital transmission system, comprising the steps of;
    transmitting a plurality of data frames of image information from said transmitter to said receiver through a line at a first transmission rate;
    determining at said receiver as to whether or not each of said data frames contains one or more data errors;
    transmitting a request from said receiver to said transmitter for retransmission of one or more data frames for which one or more data errors have occurred;
    determining whether or not said request for retransmission transmitted from said receiver is the first request for retransmission;
    calculating, only if said request for retransmission is the first request, the number of frames expected to contain errors during the time of retransmitting said one or more data frames for which one or more data errors have occurred, on the basis of a number of data frames requested to be retransmitted and a total number of data frames which have been transmitted from said transmitter to said receiver, the use of a second data transmission rate being determined based on the calculated number; and selectively shifting down said data transmission rate from said first data transmission rate to said second data transmission rate which is used for retransmitting said one or more data frames for which one or more data errors have occurred when said request for retransmission is the first request for retransmission and when said number is at least equal to a predetermined number.

12. A method as claimed in claim 11, further comprising a step of determining how many times said request for retransmission of one or more data frames is transmitted from said receiver when said request for retransmission is not the first request for retransmission, wherein when said determined number of times becomes at least equal to a predetermined number of times, said data transmission rate is shifted down from said first data transmission rate to said second data transmission rate.

13. A method as claimed in claim 11, further comprising a step of transmitting said one or more data frames requested to be transmitted at said first transmission rate without shifting down said data transmission rate, when said determined number of times is less than said predetermined number of times.

14. A method for shifting down a data transmission rate at a transmitter in response to a request from a receiver for retransmission of data frames having data errors in a digital transmission system, comprising the steps of:

transmitting a plurality of data frames of image information from said transmitter to said receiver through a line at a first data transmission rate;

determining at said receiver as to whether or not each of said data frames contains one or more data errors;

transmitting a request from said receiver to said transmitter for retransmission of one or more data frames for which one or more data errors have occurred;

calculating the number of frames expected to contain errors during the time of retransmitting said one or more data frames for which one or more data errors have occurred, on the basis of a number of data frames requested to be retransmitted and a total number of data frames which have been transmitted from said transmitter to said receiver, the use of a second data transmission rate being determined based on the calculated number; and selectively shifting down said data transmission rate from said first data transmission rate to said second data transmission rate which is used for retransmitting said one or more data frames for which one or more data errors have occurred;

determining the condition of said receiver by obtaining the rate of the occurrence of data errors from the results of a training check and comparing the error occurrence rate with a predetermined reference, and determining the use of said first data transmission rate based on the comparison; and wherein said predetermined reference is lower than another reference used in a normal data transmission mode in which retransmission is not automatically performed even if a data error occurs.

15. A method for shifting down a data transmission rate at a transmitter in response to a request from a receiver for retransmission of data frames having data errors in a digital transmission system, comprising the steps of:

transmitting a plurality of data frames of image information from said transmitter to said receiver at a first data transmission rate;

determining at said receiver as to whether or not each of said data frames contains one or more data errors;

transmitting a request from said receiver to said transmitter for retransmission of one or more data frames for which one or more data errors have occurred;

calculating a first data transmission time based on said first data transmission rate and a total number of data frames transmitted from the beginning of transmitting said plurality of data frames of image information from said transmitter, and a second data transmission time based on a second data transmission rate and a number of data frames transmitted in the first data transmission;

comparing said first and second data transmission times and generating a comparison result;

selectively shifting down said data transmission rate from said first data transmission rate to said second data transmission rate; and transmitting, at said second data transmission rate, said one or more data frames to be retransmitted when said comparison result indicates that said first data transmission time is equal to or larger than said second data transmission time, and transmitting, at said first data transmission rate, said one or more data frames to be retransmitted when said comparison result indicates that said first data transmission time is smaller than said second data transmission line.

16. A method as claimed in claim 15, wherein each of said data frames is formed in conformity with a high-level data link control (HDLC) frame format.

17. A method as claimed in claim 15, wherein said digital transmission system is a facsimile system.

18. A method as claimed in claim 15, further comprising steps of determining the condition of said receiver by obtaining the rate of the occurrence of data errors from the results of a training check and comparing the error occurrence rate with a predetermined reference, and determining the use of said first data transmission rate based on the comparison.

19. A method as claimed in claim 18, wherein said predetermined reference is lower than another reference used in a normal data transmission mode in which retransmission is not performed even if a data error occurs.

20. A method for shifting down a data transmission rate at a transmitter in response to a request from a receiver for retransmission of data frames having data errors in a digital transmission system comprising the steps of:

transmitting a plurality of data frames of image information from said transmitter to said receiver at a first data transmission rate;

determining at said receiver as to whether or not each of said data frames contains one or more data errors;

transmitting a request from said receiver to said transmitter for retransmission of one or more data frames for which one or more data errors have occurred;

calculating a first data transmission time based on said first data transmission rate and a total number of data frames to be retransmitted, and a second data transmission time based on a second data transmission rate and a number of data frames transmitted in the first retransmission;

comparing said first and second data transmission times and generating a comparison result;

selectively shifting down said data transmission rate from said first data transmission rate to said second data transmission rate; and transmitting, at said second data transmission rate, said one or more data frames to be retransmitted when said comparison result indicates that said first data transmission time is equal to or larger than said second data transmission time, and transmitting, at said first data transmission rate, said one or more data frames to be retransmitted when said comparison result indicates that said first data transmission time is smaller than said second data transmission time.

21. A method as claimed in claim 20, wherein each of said data frames is formed in conformity with a high-level data link control (HDLC) frame format.

22. A method as claimed in claim 20, wherein said digital transmission system is a facsimile system.

23. A method as claimed in claim 20, further comprising steps of determining the condition of said receiver by obtaining the rate of the occurrence of data errors from the results of a training check and comparing the error occurrence rate with a predetermined reference, and determining the use of said first data transmission rate based on the comparison.

24. A method as claimed in claim 23, wherein said predetermined reference is lower than another reference used in a normal data transmission mode in which retransmission is not performed even if a data error occurs.

25. A digital transmission device, comprising:
reading means for reading a document image to be transmitted and outputting corresponding image information;
processing means, connected to said reading means, for processing said image information supplied from said reading means to produce a plurality of data frames from said image information;
transmitting means, connected to said processing means, for transmitting said plurality of data frames supplied from said processing means to a receiver at a remote location through a transmission line;
receiving means for receiving data frames from said receiver and generating an original document image from said received data frames;
recording means, connected to said receiving means, for recording said original document supplied from said receiving means; and
control means for controlling a data transmission rate set in said transmitting means such that the data transmission rate is selectively shifted down from a first transmission rate to a second transmission rate when retransmitting one or more of said plurality of data frames,
said control means automatically determining the use of said second data transmission rate by calculating an expected number indicating the number of frames expected to contain errors at the time of retransmitting said one or more data frames for which one or more data errors have occurred, on the basis of a number of data frames requested to be retransmitted and a total number of data frames which have been transmitted from said transmitter to said receiver, wherein said expected number is a function of the square of the number of data frames to be retransmitted and the inverse of the total number of data frames which have been transmitted.

26. A digital transmission device as claimed in claim 25, wherein when said expected number is equal to or larger than a predetermined number, said control means shifts down said data transmission rate from said first data transmission rate to said second transmission rate.

27. A digital transmission device as claimed in claim 25, wherein each of said data frames is in conformity with a high-level data-link control (HDLC) frame format.

28. A digital transmission device as claimed in claim 25, wherein said digital transmission device is a facsimile machine.

29. A digital transmission device as claimed in claim 25, further comprising mean for determining how many times said request for retransmission of one or more data frames is transmitted from said receiver when said expected number is smaller than a predetermined number, wherein when said determined number of times becomes equal to a predetermined number of times, said control means shifts down said data transmission rate from said first data transmission rate to said second data transmission rate.

30. A digital transmission device as claimed in claim 29, wherein said transmitting means transmits said one or more data frames requested to be transmitted at said first transmission rate without shifting down said data transmission rate, when said determined number of times is less than said predetermined number of times.

31. A digital transmission device, comprising:
reading means for reading a document image to be transmitted and outputting corresponding image information;
processing means, connected to said reading means, for processing said image information supplied from said reading means to produce a plurality of data frames from said image information;
transmitting means, connected to said processing means, for transmitting said plurality of data frames supplied from said processing means to a receiver at a remote location through a transmission line;
receiving means for receiving data frames from said receiver and generating an original document image from said received data frames;
recording means, connected to said receiving means, for recording said original document supplied from said receiving means; and
control means for controlling a data transmission rate set in said transmitting means such that the data transmission rate is selectively shifted down from a first transmission rate to a second transmission rate when retransmitting one or more of said plurality of data frames,
said control means automatically determining the use of said second data transmission rate by calculating an expected number indicating the number of frames expected to contain errors at the time of retransmitting said one or more data frames for which one or more data errors have occurred, on the basis of a number of data frames requested to be retransmitted and a total number of data frames which have been transmitted from said transmitter to said receiver; and wherein said expected number is represented as ($n^2/N$) where n is said number of data frames requested to be retransmitted, and N is said total number of data frames which have been transmitted from said transmitter to said receiver.

32. A digital transmission device, comprising:

reading means for reading a document image to be transmitted and outputting corresponding image information;

processing means, connected to said reading means, for processing said image information supplied from said reading means to produce a plurality of data frames from said image information;

transmitting means, connected to said processing means, for transmitting said plurality of data frames supplied from said processing means to a receiver at a remote location through a transmission line;

receiving means for receiving data frames from said receiver and generating an original document image from said received data frames;

recording means, connected to said receiving means, for recording said original document supplied from said receiving means; and control means for controlling a data transmission rate set in said transmitting means such that the data transmission rate is selectively shifted down from a first transmission rate to a second transmission rate when retransmitting one or more of said plurality of data frames, said control means automatically determining the use of said second data transmission rate by calculating an expected number of indicating the number of frames expected to contain errors at the time of retransmitting said one or more data frames for which one or more data errors have occurred, on the basis of a number of data frames requested to be retransmitted and a total number of data frames which have been transmitted from said transmitter to said receiver; and first means for determining whether or not said request for retransmission transmitted from said receiver is the first request for retransmission, wherein when said request for retransmission is the first request for retransmission and when said expected number is equal to or larger than a predetermined number, said control means shifts down said data transmission rate from said first data transmission rate to said second data transmission rate.

33. A digital transmission device as claimed in claim 32, further comprising second means for investigating how many times said request for retransmission of one or more data frames is transmitted from said receiver when said request for retransmission is not the first request for retransmission, wherein when said determined number of times becomes equal to a predetermined number of times, said control means shifts down said transmission rate from said first data transmission rate to said second data transmission rate.

34. A digital transmission device as claimed in claim 32, wherein said transmitting means transmits said one or more data frames requested to be transmitted at said first transmission rate without shifting down said data transmission rate, when said determined number of times is less than said predetermined number of times.

35. A digital transmission device comprising:

reading means for reading a document image to be transmitted and outputting corresponding image information;

processing means, connected to said reading means, for processing said image information supplied from said reading means to produce a plurality of data frames from said image information;

transmitting means, connected to said processing means, for transmitting said plurality of data frames supplied from said processing means to a receiver at a remote location through a transmission line;

receiving means for receiving data frames from said receiver and generating an original document image from said received data frames;

recording means, connected to said receiving means, for recording said original document supplied from said receiving means; and control means for controlling a data transmission rate set in said transmitting means such that the data transmission rate is selectively shifted down from a first transmission rate to a second transmission rate when retransmitting one or more of said plurality of data frames, said control means comprising:

first means for calculating a first data transmission time based on said first data transmission rate and a total number of data frames transmitted from the beginning of transmitting said plurality of data frames of image information from said transmitter, and a second data transmission time based on said second data transmission rate and a number of data frames transmitted in the first data transmission; and second means for comparing said first and second data transmission times and generating a comparison result, wherein said control means controls said transmitting means so as to transmit, at said second data transmission rate, said one or more data frames to be retransmitted when said comparison result indicates that said first data transmission time is equal to or larger than said second data transmission time, and to transmit, at said first data transmission rate, said one or more data frames to be retransmitted when said comparison result indicates that said first data transmission time is smaller than said second data transmission time.

36. A digital transmission device as claimed in claim 35, further comprising memory means for temporarily storing said image information and data frames supplied from said reading means and said processing means.

37. A digital transmission device as claimed in claim 35, wherein said control means is controlled in accordance with a program which gives said control means necessary information, and said digital transmission device further comprises memory means for storing said program.

38. A digital transmission device as claimed in claim 35, further comprising third memory means for temporarily storing said one or more data frames to be retransmitted.

39. A digital transmission device as claimed in claim 35, wherein each of said data frames is formed in conformity with a high-level data link control (HDLC) frame format.

40. A digital transmission device as claimed in claim 35, wherein said digital transmission device is a facsimile machine.

41. A digital transmission device comprising:
- reading means for reading a document image to be transmitted and outputting image information;
- processing means, connected to said reading means, for processing said image information supplied from said reading means to produce a plurality of data frames from said image information;
- transmitting means, connected to said processing means, for transmitting said plurality of data frames supplied from said processing means to a receiver at a remote location through a transmission line;
- receiving means for receiving data frames from said receiver and generating an original document image from said received data frames;
- recording means, connected to said receiving means, for recording said original document supplied from said receiving means; and
- control means for controlling a data transmission rate of said transmitting means such that the data transmission rate is selectively shifted down from a first transmission rate to a second transmission rate when retransmitting one or more of said plurality of data frames, said control means comprising:
- first means for calculating a first data transmission time based on said first data transmission rate and a total number of data frames to be retransmitted, and a second data transmission time time based on said second data transmission rate and a number of data frames transmitted in the first retransmission; and
- second means for comparing said first and second data transmission times and generating a comparison result;
- wherein said control means controls said transmitting means so as to transmit, at said second data transmission rate, said one or more data frames to be retransmitted when said comparison result indicates that said first data transmission time is equal to or larger than said second data transmission time and to transmit, at said first data transmission rate, said one or more data frames to be retransmitted when said comparison result indicates that said first data transmission time is smaller than said second data transmission time.

42. A digital transmission device as claimed in claim 41, further comprising memory means for temporarily storing said image information and data frames supplied from said reading means and said processing means.

43. A digital transmission device as claimed in claim 41, wherein said control means is controlled in accordance with a program which gives said control means necessary information, and said digital transmission device further comprises memory means for storing said program.

44. A digital transmission device as claimed in claim 41, further comprising memory means for temporarily storing said one or more data frames to be retransmitted.

45. A digital transmission device as claimed in claim 41, wherein each of said data frames is formed in conformity with a high-level data link control (HDLC) frame format.

46. A digital transmission device as claimed in claim 41, wherein said digital transmission device is a facsimile machine.

* * * * *